US009359227B2

(12) United States Patent
Omori

(10) Patent No.: US 9,359,227 B2
(45) Date of Patent: Jun. 7, 2016

(54) POROUS FORMED ARTICLE, AND METHOD FOR MANUFACTURING THE SAME

(75) Inventor: Akihiro Omori, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 281 days.

(21) Appl. No.: 13/505,880

(22) PCT Filed: Nov. 19, 2010

(86) PCT No.: PCT/JP2010/070742
§ 371 (c)(1),
(2), (4) Date: May 3, 2012

(87) PCT Pub. No.: WO2011/062277
PCT Pub. Date: May 26, 2011

(65) Prior Publication Data
US 2012/0219799 A1  Aug. 30, 2012

(30) Foreign Application Priority Data
Nov. 20, 2009  (JP) .................................. 2009-265164

(51) Int. Cl.
*B01J 20/26* (2006.01)
*B05B 17/04* (2006.01)
*C02F 1/28* (2006.01)
(Continued)

(52) U.S. Cl.
CPC ............... *C02F 1/288* (2013.01); *B01J 20/06* (2013.01); *B01J 20/08* (2013.01); *B01J 20/16* (2013.01); *B01J 20/262* (2013.01); *B01J 20/28004* (2013.01); *B01J 20/28042* (2013.01); *B01J 20/28057* (2013.01); *B01J 20/28088* (2013.01); *B01J 20/3021* (2013.01); *B01J 20/3085* (2013.01); *B01J 20/3204* (2013.01); *B01J 20/3236* (2013.01); *C08J 3/16* (2013.01); *C08J 9/28* (2013.01); *C08J 2201/0522* (2013.01); *C08J 2381/06* (2013.01); *C08J 2481/06* (2013.01); *Y10T 428/2982* (2015.01)

(58) Field of Classification Search
None
See application file for complete search history.

(56) References Cited

U.S. PATENT DOCUMENTS 4,625,000 A * 11/1986 Chao et al. ..................... 525/534
5,462,867 A * 10/1995 Azad et al. .................... 435/181
(Continued)

FOREIGN PATENT DOCUMENTS

CN    101422701 A    5/2009
EP      1695760 A1    8/2006
(Continued)

OTHER PUBLICATIONS

Office Action issued in Korean Patent Application No. 10-2012-7005791 dated Sep. 26, 2013.
(Continued)

*Primary Examiner* — Ronak Patel
(74) *Attorney, Agent, or Firm* — Morgan, Lewis & Bockius LLP

(57) ABSTRACT

There is provided a porous formed article which can remove hazardous substances at a high speed, has a high adsorption capacity and has high durability to cleaning chemicals and further which is scarcely broken even if being repeatedly used, and which contains an organic polymeric resin and an inorganic ion-adsorbing material, wherein the organic polymeric resin is a polyether sulfone resin and/or a polysulfone resin, and is an organic polymeric resin having a hydroxyl group.

22 Claims, 2 Drawing Sheets

(51) Int. Cl.

| | |
|---|---|
| *C08J 3/16* | (2006.01) |
| *C08J 9/28* | (2006.01) |
| *B01J 20/06* | (2006.01) |
| *B01J 20/08* | (2006.01) |
| *B01J 20/16* | (2006.01) |
| *B01J 20/30* | (2006.01) |
| *B01J 20/32* | (2006.01) |
| *B01J 20/28* | (2006.01) |

(56) References Cited

U.S. PATENT DOCUMENTS

2007/0128424 A1  6/2007  Omori et al.
2011/0108478 A1*  5/2011  Taguchi et al. .......... 210/500.33
2011/0215049 A1  9/2011  Qin

FOREIGN PATENT DOCUMENTS

| JP | 2006-297382 A | 2/2006 |
| JP | 2DO8-238132 A | 9/2008 |
| WO | 2005/056175 A1 | 6/2005 |
| WO | WO 2009/125598 | * 10/2009 |

OTHER PUBLICATIONS

European Search Report issued in European Patent Application No. 10831669.6 dated Jul. 17, 2015.

* cited by examiner

POROUS FORMED ARTICLE, AND METHOD FOR MANUFACTURING THE SAME

The present application is a U.S. National Phase Application of International Application No. PCT/JP2010/070742 filed Nov. 19, 2010, which claims the benefit of priority of Japanese Application No. 2009-265164 filed Nov. 20, 2009, the disclosures of which are incorporated herein by reference in their entireties.

TECHNICAL FIELD

The present invention relates to a porous formed article, and a method for manufacturing the same.

BACKGROUND ART

The environmental standards for phosphorus, boron, arsenic, fluorine ions and the like in drinking water, industrial water, industrial wastewater, sewerage-treating water and various types of environmental waters have recently been tightened from the eutrophic problem due to environmental pollutions, and demands for technologies for removing these have been raised.

Phosphorus is a causative substance of eutrophy, and the regulation has been tightened especially in closed water areas. Additionally, since phosphorus is also an element whose depletion is feared, technologies for recovering it from wastewater and reutilize it are demanded.

Although boron is an essential element for growth of plants, if it exists excessively, it is known to adversely affect growth of plants. Further for human bodies, if it is contained in drinking water, the possibility is pointed out that it affects health, especially causes health disorders such as a decrease in the reproductive function.

Arsenic is contained in wastewater of nonmetal refining industries, hot wastewater of geothermal power plants, groundwater of specific area and the like. The toxicity of arsenic has long been known, and arsenic is accumulative in living bodies and is said to develop chronic intoxication, body weight reduction, perception disorder, liver disorder, dermal deposition, skin cancer and the like.

Fluorine is much contained in wastewaters from metal refining industries, glass industries, electronic material industries and the like. The influence of fluorine on human bodies is feared, and it is known that if fluorine is ingested excessively, mottled enamel, osterosclerosis and chronic fluorine toxicosis such as thyroid disorder are caused.

The amount of emission of these hazardous substances has been increased year by year along with the development of industries, and technologies for efficiently removing these hazardous substances are demanded.

As a technology for removing various types of hazardous substances as described above, for example, a technology is known which uses an adsorbent in which a powder of an inorganic ion-adsorbing material such as a hydrous ferrite salt of zirconium or hydrous cerium oxide is carried on a polymeric material.

Patent Literature 1 describes the invention of a porous formed article containing an organic polymeric resin and an inorganic ion-adsorbing material, and states that the porous formed article adsorbs phosphorus, boron and the like. A method for manufacturing the porous formed article is additionally described.

CITATION LIST

Patent Literature

Patent Literature 1: WO 2005/056175

SUMMARY OF INVENTION

Problems to be Solved by the Invention

In the porous formed article carrying an inorganic ion-adsorbing material in the conventional technology, in order to enhance the carrying property (adhesive strength) of an organic polymeric resin and the inorganic ion-adsorbing material, a combination thereof having a high affinity for each other needs to be selected.

For example, since the inorganic ion-adsorbing material such as a hydrous ferrite salt of zirconium or hydrous cerium oxide is hydrophilic, it is known that as an organic polymeric resin, an ethylene vinyl alcohol copolymer (EVOH) and a polyacrylonitrile (PAN), which are hydrophilic, are selected.

In the case where the porous formed article carrying an inorganic ion-adsorbing material in the conventional technology as described above is used for water treatment applications to remove ions such as phosphorus and fluorine in wastewater, there arises a problem that while the wastewater is passed, foulings by microorganisms are generated, and in the extraordinary case, a pressure rise is caused to pass the wastewater.

In order to clean such foulings, the foulings are usually cleaned using an oxidizing agent such as sodium hypochlorite.

However, hydrophilic organic polymeric resins such as EVOH and PAN, since having a low resistance to oxidizing agents such as sodium hypochlorite, have a problem that a cleaning method using an oxidizing agent cannot be applied actively.

Then, the present invention has an object to provide: a porous formed article suitable as an adsorbent, which can adsorb and remove hazardous substances such as phosphorus, boron, fluorine, arsenic and the like contained in service water and wastewater at a high speed, has a large capacity, has high durability to oxidizing agents such as sodium hypochlorite, and can be used repeatedly; and a method for manufacturing the same.

Means for Solving the Problems

As a result of exhaustive studies to solve the above-mentioned problem with the conventional technology, the present inventors have found that a porous formed article containing an organic polymeric resin having a hydroxyl group and a powder of an inorganic ion-adsorbing material as an adsorption substrate is a porous formed article suitable for an adsorbent which can remove hazardous substances at a high speed, has a high adsorption capacity, has high durability to cleaning chemicals such as oxidizing agents, and can be used repeatedly, and this finding has led to the completion of the present invention.

That is, the present invention is as follows.

[1] A porous formed article comprising an organic polymeric resin and an inorganic ion-adsorbing material, wherein the organic polymeric resin is a polyether sulfone resin and/or a polysulfone resin, and is an organic polymeric resin having a hydroxyl group.

[2] The porous formed article according to the above [1], wherein the organic polymeric resin has a hydroxyl group at a terminal thereof.

[3] The porous formed article according to the above [1] or [2], wherein the organic polymeric resin has a terminal hydroxyl group composition of 5 to 100 mol %.

[4] The porous formed article according to any one of the above [1] to [3], wherein the organic polymeric resin is an organic polymeric resin represented by the following general formula (1).

[Formula 1]

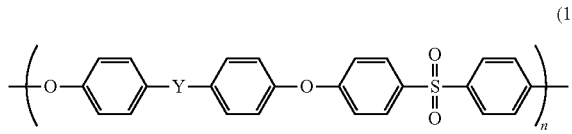
(1)

In the above general formula (1), n denotes an integer of 1 or more; Y denotes one selected from a direct bond, O, S, SO$_2$, CO, C(CH$_3$)$_2$, CH(CH$_3$) and CH$_2$; and a hydrogen atom of the benzene ring may be replaced by an alkyl group having 1 to 6 carbon atoms or an aryl group having 6 to 8 carbon atoms.

[5] The porous formed article according to any one of the above [1] to [4], wherein the organic polymeric resin is a polyether sulfone resin represented by the following general formula (2).

[Formula 2]

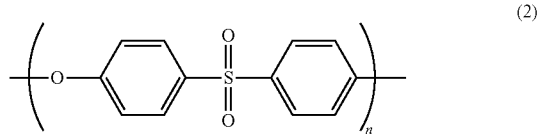
(2)

In the above general formula (2), n denotes an integer of 2 or more; and a hydrogen atom of the benzene ring may be replaced by an alkyl group having 1 to 6 carbon atoms or an aryl group having 6 to 8 carbon atoms.

[6] The porous formed article according to any one of the above [1] to [5], wherein the organic polymeric resin forms a porous structure having a communicating pore; and the organic polymeric resin carries an inorganic ion-adsorbing material on an outer surface of and in an interior thereof.

[7] The porous formed article according to any one of the above [1] to [6], wherein the porous formed article has a porosity Pr (%) of 50% to 95%.

[8] The porous formed article according to any one of the above [1] to [7], wherein the amount of the inorganic ion-adsorbing material carried is 65 to 95%.

[9] The porous formed article according to any one of the above [1] to [8], wherein the porous formed article has a relative cumulative X-ray intensity ratio of 1 to 10.

[10] The porous formed article according to any one of the above [1] to [9], wherein the porous formed article is a spherical material having an average particle diameter of 100 to 2,500 μm.

[11] The porous formed article according to any one of the above [1] to [10], wherein the inorganic ion-adsorbing material comprises at least one metal oxide represented by the following formula (i):

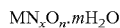 (i)

wherein x is 0 to 3, n is 1 to 4, and m is 0 to 6; and M and N are each a metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta, and are different from each other.

[12] The porous formed article according to the above [11], wherein the metal oxide is one or a mixture of two or more selected from the group consisting of the following (a) to (c):
(a) titanium oxide hydrate, zirconium oxide hydrate, tin oxide hydrate, cerium oxide hydrate, lanthanum oxide hydrate and yttrium oxide hydrate;
(b) an oxide of a composite metal of one metal element selected from the group consisting of titanium, zirconium, tin, cerium, lanthanum and yttrium with one metal element selected from the group consisting of aluminum, silicon and iron; and
(c) an activated alumina.

[13] The porous formed article according to any one of the above [1] to [12], wherein the inorganic ion-adsorbing material comprises an activated alumina impregnated with aluminum sulfate and/or an activated carbon impregnated with aluminum sulfate.

[14] An adsorbent comprising a porous formed article according to any one of the above [1] to [13].

[15] A method for manufacturing a porous formed article comprising an organic polymeric resin and an inorganic ion-adsorbing material, comprising:
a crushing and mixing step of crushing and mixing a good solvent of the organic polymeric resin, the inorganic ion-adsorbing material and a water-soluble polymer so as to obtain a slurry;
a dissolving step of mixing and dissolving the organic polymeric resin in the slurry so as to obtain a slurry for forming; and
a coagulating step of coagulating the slurry for forming in a poor solvent of the organic polymeric resin.

[16] The method for manufacturing the porous formed article according to the above [15], wherein the crushing and mixing step is carried out using an agitated media mill.

[17] The method for manufacturing the porous formed article according to the above [15] or [16], wherein the good solvent of the organic polymeric resin is one or more selected from the group consisting of N-methyl-2-pyrrolidone (NMP), N,N-dimethylacetamide (DMAC) and N,N-dimethylformamide (DMF).

[18] The method for manufacturing the porous formed article according to any one of the above [15] to [17], wherein the poor solvent comprises water.

[19] The method for manufacturing the porous formed article according to the above [18], wherein in the coagulating step, the mixing ratio of the poor solvent to the good solvent is 100 to 40% by mass: 0 to 60% by mass.

[20] The method for manufacturing the porous formed article according to any one of the above [15] to [19], wherein the coagulating step comprises a step of scattering the slurry for forming contained in a container from a nozzle provided on the side surface of a rotating container to thereby form a liquid droplet.

[21] The method for manufacturing the porous formed article according to any one of the above [15] to [20], wherein in the crushing and mixing step, the water-soluble polymer is added so that the water-soluble polymer/(the water-soluble polymer+the organic polymeric resin+the good solvent of the organic polymeric resin) is in a range of 0.1 to 40% by mass.

Advantageous Effects of Invention

According to the present invention, a porous formed article suitable for an adsorbent can be provided which can remove hazardous substances at a high speed, has a high adsorption capacity, has high durability to cleaning chemicals, and further in which an inorganic ion-adsorbing material is firmly carried because the inorganic ion-adsorbing material and an organic polymeric resin have a high affinity for each other, and which is thereby scarcely broken even if being repeatedly used.

MODE FOR CARRYING OUT THE INVENTION

Figure 1:
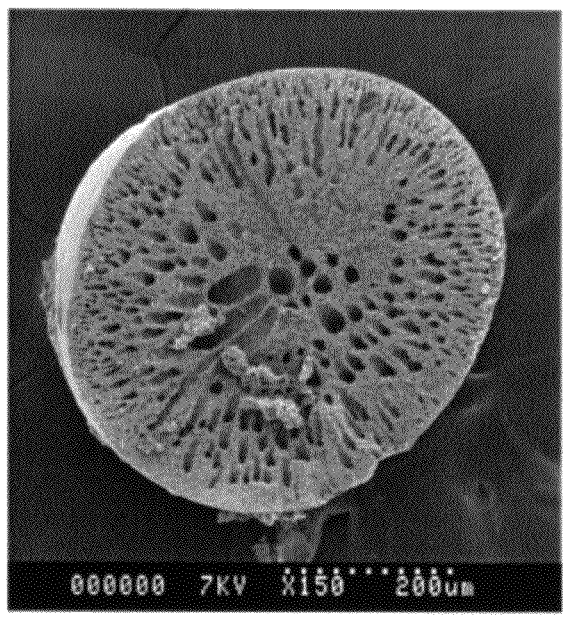
FIG. 1 shows an electron microscopic photograph (magnification: 150×) of a cut cross-section of a formed article of Example 1.

Hereinafter, an embodiment to carry out the present invention (hereinafter, referred to as the present embodiment) will be described, but the present invention is not limited to the following embodiment, and may be variously changed and modified and carried out within the gist of the present invention.

[A Porous Formed Article]

A porous formed article according to the present embodiment is one containing an organic polymeric resin and an inorganic ion-adsorbing material, wherein the organic polymeric resin is a polyether sulfone resin and/or a polysulfone resin, and is an organic polymeric resin having a hydroxyl group.

(The Organic Polymeric Resin)

The organic polymeric resin constituting the porous formed article according to the present embodiment forms a porous structure, and is a polyether sulfone resin and/or a polysulfone resin, and is an organic polymeric resin having a hydroxyl group.

Because the organic polymeric resin has the hydroxyl group, the affinity for an inorganic ion-adsorbing material improves, thereby enabling prevention of peeling-off of the inorganic ion-adsorbing material.

In the present embodiment, the polyether sulfone resin refers to a resin of a polymeric compound having a repeating structure containing a sulfonyl group and an ether bond.

The polyether sulfone resin is preferably an organic polymeric resin represented by the following general formula (1). In the following general formula (1), n denotes an integer of 1 or more; Y denotes one selected from a direct bond, O, S, $SO_2$, CO, $C(CH_3)_2$, $CH(CH_3)$ and $CH_2$. In the following general formula (1), a hydrogen atom of the benzene ring may be replaced, and may be replaced, for example, by an alkyl group having 1 to 6 carbon atoms or an aryl group having 6 to 8 carbon atoms.

The polyether sulfone resin is more preferably one represented by the following general formula (2) in which Y is $SO_2$.

In the following general formula (2), n denotes an integer of 2 or more; and a hydrogen atom of the benzene ring may be replaced, and may be replaced, for example, by an alkyl group having 1 to 6 carbon atoms or an aryl group having 6 to 8 carbon atoms.

In the present embodiment, the polysulfone resin refers to a resin of a polymeric compound having a repeating structure containing a sulfonyl group.

The polysulfone resin preferably has a bisphenol A residue or a biphenylene group.

The polysulfone resin is more preferably an organic polymeric resin represented by the following general formula (1).

The polysulfone resin is still more preferably a polyaryl sulfone resin represented by the following general formula (3) in which Y in an organic polymeric resin represented by the following general formula (1) is a direct bond, or a polysulfone resin represented by the following general formula (4) in which Y therein is $C(CH_3)_2$.

In the following general formulae (3) and (4), n denotes an integer of 1 or more; and a hydrogen atom of the benzene ring may be replaced, and may be replaced, for example, by an alkyl group having 1 to 6 carbon atoms or an aryl group having 6 to 8 carbon atoms.

[Formula 3]

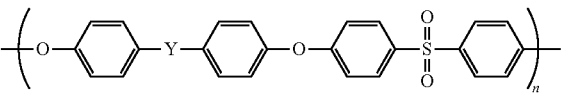

(1)

[Formula 4]

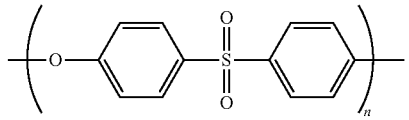

(2)

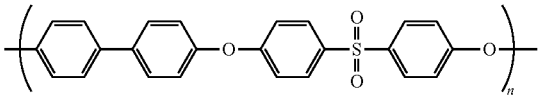

(3)

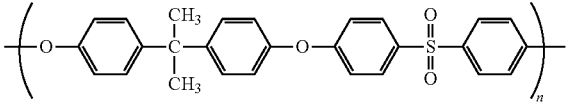

(4)

The organic polymeric resin has a weight-average molecular weight (Mw) of preferably 10,000 to 140,000, more preferably 20,000 to 90,000, and still more preferably 30,000 to 80,000.

The weight-average molecular weight can be measured by gel permeation chromatography (GPC).

The organic polymeric resin preferably has a hydroxyl group at a terminal thereof.

Because the organic polymeric resin has the hydroxyl group as a terminal group, in the porous formed article according to the present embodiment, an excellent carrying performance of an inorganic ion-adsorbing material can be exhibited. Additionally, since the organic polymeric resin having a high hydrophobicity has a hydroxyl group at a terminal thereof, foulings are hardly generated even if the porous formed article according to the present embodiment is used for a water treatment application.

In the organic polymeric resin, the proportion of terminal groups which are hydroxyl groups in all terminal groups (hereinafter, a terminal hydroxyl group composition) is preferably 5 to 100 mol %.

If the terminal hydroxyl group composition is 5 mol % or more, the affinity for an inorganic ion-adsorbing material increases and the carrying performance becomes excellent; and if that is 100 mol % or less, the chemical resistance to an oxidizing agent and the like becomes excellent. The terminal hydroxyl group composition is more preferably 10 to 100 mol %, still more preferably 40 to 100 mol %, and further still more preferably 60 to 100 mol %.

The quantification of terminal hydroxyl groups of the organic polymeric resin can be measured by the nuclear magnetic resonance method (NMR).

That is, signals of protons adjacent (ortho position) to the terminal group are separated based on whether the terminal group is a hydroxyl group ($H_{OH}$) or another ($H_X$) (for example, a Cl group ($H_{Cl}$) or a t-butyl group ($H_t$)), and the terminal hydroxyl group can be quantitatively determined from the integrated value of the signal. The area ratio of 1H-NMR signals reflects their molar numbers as well known, and thus the terminal hydroxyl group composition (mol %) can be calculated by the following expression.

[Terminal hydroxyl group composition (mol %)]=[a peak area of $H_{OH}$]/([the peak area of $H_{OH}$]+[a peak area of $H_X$])×100

Specifically, the terminal hydroxyl group composition can be measured by the following method. First, a porous formed article is ground using a mortar or the like, dissolved in a solvent described below at a heated temperature of lower than the boiling point of the solvent, and subjected to a centrifugal separation method to separate an organic polymeric resin; and a supernatant liquid is taken as a measuring sample.

Protons can be observed in a high resolution using 1H-NMR at 400 MHz in a deuterated N,N-dimethylformamide (d-DMF) solvent in an integration frequency of 512.

In the case where terminal hydroxyl groups and terminal chlorine groups are present as terminal groups of an organic polymeric resin, two protons ($H_{Cl}$) adjacent to a chlorine-substituted aromatic carbon can be observed at 7.7 ppm, and two protons ($H_{OH}$) adjacent to a hydroxyl group-substituted aromatic carbon can be observed at 6.9 ppm. Then, in the case where terminal hydroxyl groups and terminal chlorine groups are present in 1:1, the terminal hydroxyl group composition can be expressed to be 50 mol %.

In the case where terminal group of an organic polymeric resin is constituted of hydroxyl groups, chlorine groups and t-butyl groups, in NMR, in addition to the terminal chlorine and the terminal hydroxyl group, two protons ($H_t$) adjacent to a t-butyl-substituted aromatic carbon can be identified at about 1.2 ppm as a new peak. In the case of terminal chlorine groups/terminal hydroxyl groups/terminal t-butyl groups=20/10/70 (mol %), the terminal hydroxyl group composition can be expressed to be 10 mol % using the proton area ratio.

The structure of an organic polymeric resin constituting the porous formed article according to the present embodiment can be identified by extracting the organic polymeric resin and using a nuclear magnetic resonance method (NMR) or the like.

The extraction method of an organic polymeric resin is not especially limited, but examples thereof include a method in which a porous formed article is dissolved using a solvent such as deuterated N,N-dimethylformamide (d-DMF), and thereafter subjected to a separation operation to extract the organic polymeric resin.

The organic polymeric resin constituting the porous formed article according to the present embodiment is preferably a polyether sulfone resin. The organic polymeric resin is a polyether sulfone resin having a hydroxyl group, and thus the affinity for an inorganic ion-adsorbing material improves, thereby enabling prevention of peeling-off of the inorganic ion-adsorbing material. Further, the durability to cleaning chemical agents improves, which is preferable.

In the present embodiment, the polyether sulfone resin is preferably a polyether sulfone resin represented by the following general formula (2) from the viewpoint of the durability of a porous formed article.

In the following general formula (2), n denotes an integer of 2 or more; and a hydrogen atom of the benzene ring may be replaced, and may be replaced, for example, by an alkyl group having 1 to 6 carbon atoms or an aryl group having 6 to 8 carbon atoms.

[Formula 5]

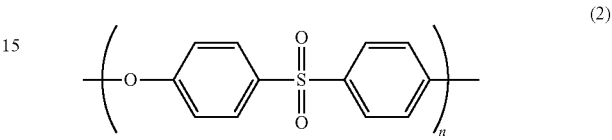

(2)

As the organic polymeric resin constituting the porous formed article according to the present embodiment, organic polymeric resins different in the molecular weight and the amount of the hydroxyl group can be used as a mixture of two or more thereof in the range of not decreasing the carrying performance of an inorganic ion-adsorbing material described later.

(The Inorganic Ion-Adsorbing Material)

The inorganic ion-adsorbing material constituting the porous formed article according to the present embodiment refers to an inorganic substance exhibiting an ion adsorption phenomenon or an ion exchange phenomenon.

Inorganic ion-adsorbing bodies originated from natural substances include various types of mineral substances such as zeolite and montmorillonite. Specific examples of the various types of mineral substances include kaolin minerals being an aluminosilicate salt and having a single layer lattice, white mica having a double layer lattice structure, glauconite, Kanuma soil, pyrophyllite, talc, feldspar having a three-dimensional skeleton structure and zeolite.

Examples of inorganic ion-adsorbing bodies of synthetic type include metal oxides (metal oxides, composite metal oxides, composite metal hydroxides, hydrous oxides of metals and the like), salts of polyvalent metals, and insoluble hydrous oxides.

The inorganic ion-adsorbing material is preferably a metal oxide represented by the following formula (i). The inorganic ion-adsorbing material may contain plural kinds of metal oxides represented by the following formula (i).

$MN_xO_n \cdot mH_2O$ (i)

Here, in the above formula (i), x is 0 to 3, n is 1 to 4, and m is 0 to 6; and M and N are each one metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta, and are different from each other.

The metal oxide may be an anhydrous (anhydrate) metal oxide represented by the above formula (i) in which m is 0, or may be a hydrous oxide of a metal (a metal oxide hydrate) in which m is a numerical value excluding 0.

A metal oxide in which x in the above formula (i) is a numerical value excluding 0 is a composite metal oxide in which each metal element contained distributes homogeneously across the whole oxide with a regularity, and which is represented by a chemical formula having a fixed compositional ratio of each metal element contained in the metal oxide.

Specifically, the composite metal oxide forms a perovskite structure, a spinel structure or the like, and includes nickel ferrite ($NiFe_2O_4$) and a hydrous ferrite salt of zirconium ($Zr.Fe_2O_4.mH_2O$, m is 0.5 to 6).

As an inorganic ion-adsorbing material, one or more metal oxides are preferably selected from the group consisting of:
(a) titanium oxide hydrate, zirconium oxide hydrate, tin oxide hydrate, cerium oxide hydrate, lanthanum oxide hydrate and yttrium oxide hydrate;
(b) a composite metal oxide of one metal element selected from the group consisting of titanium, zirconium, tin, cerium, lanthanum and yttrium with one metal element selected from the group consisting of aluminum, silicon and iron; and
(c) an activated alumina,
from the viewpoint of being excellent in the adsorbing performance of phosphorus, boron, fluorine and arsenic. As a material selected from these groups, materials may be combined which are selected from one of these groups, or may be suitably combined which are selected from each group of the (a), (b) and (c) groups.

The inorganic ion-adsorbing material preferably contains an activated alumina impregnated with aluminum sulfate and/or an activated carbon impregnated with aluminum sulfate. These have advantages of being inexpensive and having a high adsorbability.

A metal oxide represented by the above formula (i) in which a metal element other than the above-mentioned M and N is further dissolved as a solid solution is more preferable from the viewpoint of the adsorbability of inorganic ions and the production cost.

An example thereof includes a metal oxide in which iron is dissolved as a solid solution in a zirconium oxide hydrate represented by the formula $ZrO_2.mH_2O$ according to the above formula (i).

Examples of the salt of the polyvalent metal include hydrotalcite-type compounds represented by the following formula (ii).

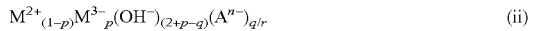

$$M^{2+}{}_{(1-p)}M^{3-}{}_p(OH^-)_{(2+p-q)}(A^{n-})_{q/r} \quad (ii)$$

In the above formula (ii), $M^{2+}$ denotes at least one divalent metal ion selected from the group consisting of $Mg^{2+}$, $Ni^{2+}$, $Zn^{2+}$, $Fe^{2-}$, $Ca^{2+}$ and $Cu^{2+}$.

$M^{3+}$ denotes at least one trivalent metal ion selected from the group consisting of $Al^{3+}$ and $Fe^{3+}$: and $A^{3-}$ denotes an n-valent anion.

Further, $0.1 \leq p \leq 0.5$, $0.1 \leq q \leq 0.5$, and r is 1 or 2.

The hydrotalcite-type compounds represented by the above formula (ii) are preferable because raw materials are inexpensive and the adsorbability is high as the inorganic ion-adsorbing material.

The insoluble hydrous oxide includes insoluble heteropolyacid salts and insoluble hexacyanoferrate salts.

The structure of an inorganic ion-adsorbing material constituting the porous formed article according to the present embodiment is not especially limited, but is preferably a mixed structure in which the circumference of a specific metal oxide is covered with another metal oxide. By making this mixed structure, properties which each metal oxide has are made effective use of, and an inorganic ion-adsorbing material exhibiting a better cost performance can be obtained.

An example of such a structure includes a structure in which the circumference of ferrosoferric oxide is covered with a zirconium oxide hydrate. As described above, metal oxides include ones in which another element is dissolved as a solid solution. Therefore, a structure is also preferable in which the circumference of ferrosofferic oxide in which zirconium is dissolved as a sold solution is covered with a zirconium oxide hydrate in which iron is dissolved as a solid solution.

Here, a zirconium oxide hydrate has a high adsorbing performance for ions such as phosphorus, boron, fluorine and arsenic, and a high durability performance for repeating usage, and is expensive; but by contrast, ferrosofferic oxide has a lower adsorbing performance for ions such as phosphorus, boron, fluorine and arsenic, and a lower durability performance for repeating usage than the zirconium oxide hydrate, and is very inexpensive.

Therefore, in the case where a structure is made in which the circumference of ferrosofferic oxide is covered with a zirconium oxide hydrate, since the vicinity of the surface of an inorganic ion-adsorbing material responsible for the adsorption of ions is made of the zirconium oxide hydrate, which has a high adsorbing performance and a high durability performance, and by contrast, since the interior not responsible for the adsorption is made of the inexpensive ferrosofferic oxide, the structure can be utilized as an adsorbent which has a high adsorbing performance and a high durability performance, and is of a low cost, that is, very excellent in the cost performance, which is preferable.

From the above described, for adsorption and removal of ions of phosphorus, boron, fluorine and arsenic hazardous to the environment and health, it is preferable from the viewpoint of obtaining an adsorbent excellent in the cost performance that an inorganic ion-adsorbing material is constituted of a structure in which the circumference of a metal oxide in which at least one of M and N in the above formula (i) is a metal element selected from the group consisting of aluminum, silicon and iron is covered with a metal oxide in which at least one of M and N in the above formula (i) is a metal element selected from the group consisting of titanium, zirconium, tin, cerium, lanthanum and yttrium.

In this case, with respect to the content ratio of a metal element selected from the group consisting of aluminum, silicon and iron in an inorganic ion-adsorbing material, if the total molar number of the metal element selected from the group consisting of aluminum, silicon and iron and a metal element selected from the group consisting of titanium, zirconium, tin, cerium, lanthanum and yttrium is taken as T, and the molar number of the metal element selected from the group consisting of aluminum, silicon and iron is taken as F, F/T (molar ratio) is preferably in a range of 0.01 to 0.95, more preferably 0.1 to 0.90, still more preferably 0.2 to 0.85, and further still more preferably 0.3 to 0.80.

If F/T (molar ratio) is made too large, the adsorbing performance and durability performance are likely to become low; and if small, an effect on cost reduction becomes low.

Depending on metals, some metals exist which give their metal oxides in a plurality of forms different in the oxidation number of metal element, but if those are stably present in an inorganic ion-adsorbing material, the forms are not especially limited.

For example, in the case of oxides of iron, a ferric oxide hydrate (general formula: $FeO_{1.5}.mH_2O$) or a ferrosofferic oxide hydrate (general formula: $FeO_{1.33}.mH_2O$) is preferable from a problem of the oxidation stability in the air.

An inorganic ion-adsorbing material constituting the porous formed article according to the present embodiment may contain impurity elements mingled due to its manufacturing method and the like in the range of not inhibiting the function of the porous formed article according to the present embodiment. The impurity elements which may be mingled include nitrogen (nitric acid form, nitrous acid form, ammonium form), sodium, magnesium, sulfur, chlorine, potassium, calcium, copper, zinc, bromine, barium and hafnium.

It is preferable that an inorganic ion-adsorbing material constituting the porous formed article according to the present embodiment has a specific surface area in a fixed range, because the specific surface area affects the adsorbing performance and the durability performance.

Specifically, the BET specific surface area determined by the nitrogen adsorption method is preferably 20 to 1,000 $m^2/g$, more preferably 30 to 800 $m^2/g$, still more preferably 50 to 600 $m^2/g$, and further still more preferably 60 to 500 $m^2/g$. If the BET specific surface area is too small, the adsorbing performance decreases; and if too large, the solubility in an acid and alkali becomes large, resulting in a decrease in the durability performance to repeating usage.

A method for manufacturing an inorganic ion-adsorbing material will be described by taking a metal oxide represented by the above formula (i) as an example. The method for manufacturing the metal oxide is not especially limited, but for example, involves filtrating and cleaning a precipitate obtained by adding an alkali solution to a salt aqueous solution such as a metal hydrochloride, a sulfate salt or a nitrate salt, and thereafter drying the cleaned precipitate to obtain the metal oxide. Drying is carried out by air-drying, or by drying at about 150° C. or lower, preferably about 90° C. or lower for about 1 to 20 hours.

Then, a method for manufacturing a mixed structure in which the circumference of a specific metal oxide is covered with another metal oxide will be described by taking as an example the case of manufacturing an inorganic ion-adsorbing material having a structure in which the circumference of ferrosofferic oxide is covered with zirconium oxide. The manufacturing method of this example corresponds also to a manufacturing method of an inorganic ion-adsorbing material having a structure in which the circumference of a metal oxide in which at least one of M and N in the above formula (i) is a metal element selected from the group consisting of aluminum, silicon and iron is covered with a metal oxide in which at least one of M and N in the above formula (i) is a metal element selected from the group consisting of titanium, zirconium, tin, cerium, lanthanum and yttrium.

First, a salt aqueous solution is fabricated which is prepared by mixing a salt of zirconium such as a chloride, a nitrate salt or a sulfate salt thereof, and a salt of iron such as a chloride, a nitrate salt or a sulfate salt thereof so that the above-mentioned F/T (molar ratio) becomes a predetermined value. Thereafter, an alkali solution is added thereto, and the pH is adjusted to 8 to 9.5, preferably 8.5 to 9 to produce a precipitate. Thereafter, the temperature of the aqueous solution is made 50° C., and air is blown in while the pH is held at 8 to 9.5, preferably 8.5 to 9, to carry out an oxidation treatment until ferrous ions cannot be detected in the liquid phase. Then, the produced precipitate is filtered out, and washed with water, and then dried to obtain the inorganic ion-adsorbing material. Drying is carried out by air-drying, or by drying at about 150° C. or lower, preferably about 90° C. or lower, for about 1 to 20 hours. The water content after the drying is preferably in a range of about 6 to 30% by mass.

The salt of zirconium used in the above-mentioned manufacturing method include zirconium oxychloride ($ZrOCl_2$), zirconium tetrachloride ($ZrCl_4$), zirconium nitrate ($Zr(NO_3)_4$) and zirconium sulfate ($Zr(SO_4)_2$). These may be, for example, a hydrous salt such as ($Zr(SO_4)_2 \cdot 4H_2O$).

These metal salts are usually used in a solution form of about 0.05 to 2.0 mol in one liter.

The salt of iron used in the above-mentioned manufacturing method includes ferrous salts such as ferrous sulfate ($FeSO_4$), ferrous nitrate ($Fe(NO_3)_2$) and ferrous chloride ($FeCl_2$). These may be hydrous salts such as $FeSO_4 \cdot 7H_2O$. These ferrous salts are usually added as a solid substance, but may be added in a solution form.

Examples of the alkali include sodium hydroxide, potassium hydroxide, calcium hydroxide, ammonia and sodium carbonate.

The salt of zirconium and the salt of iron are preferably used as an aqueous solution of about 5 to 20% by mass.

In the case where an oxidative gas is blown in in the oxidation treatment step, the time, although depending on the kinds of oxidative gases, is about 1 to 10 hours. In the case where an oxidizing agent is used in place of the treatment of blowing air in in the oxidation treatment step, examples of the oxidizing agent to be used are hydrogen peroxide, sodium hypochlorite and potassium hypochlorite.

(Structure of the Porous Formed Article)

<Porous Structure>

It is preferable that the porous formed article according to the present embodiment forms a porous structure in which an organic polymeric resin has a communicating pore, and that the porous formed article has a structure in which an inorganic ion-adsorbing material is carried on the outer surface of and in the interior of the organic polymeric resin constituting the porous structure.

Here, the porous structure having the communicating pore refers to a fibrous structural body in which a three-dimensional continuous network structure is formed on the outer surface of and in the interior of the porous formed article. The porous structure may contain an organic polymeric resin other than a polyether sulfone resin and a polysulfone resin. The other resin includes polyvinylidene fluoride (PVDF), polyacrylonitrile (PAN) and an ethylene vinyl alcohol copolymer (EVOH).

The thickness of fibrous portions in the porous structure is preferably 0.01 μm to 50 μm.

<Dispersion State of the Inorganic Ion-Adsorbing Material>

The dispersion state in a porous formed article of the inorganic ion-adsorbing material carried on the porous formed article according to the present embodiment can be quantitatively determined by measurement using an electron probe microanalyzer (EPMA). That is, the plane analysis is carried out using an electron probe microanalyzer (EPMA), and data on the plane analysis acquired by the analysis (frequency distribution of the X-ray intensity (count number)) is statistically processed.

Specifically, the dispersion state can be measured by determining the ratio (relative cumulative X-ray intensity ratio) of a 95% relative cumulative X-ray intensity to a 5% relative cumulative X-ray intensity in a concentration distribution of an element of an inorganic ion-adsorbing material determined from an analysis by EPMA.

The 5% relative cumulative X-ray intensity is a value of an X-ray intensity at which the cumulative total of frequencies of X-ray intensities reaches 5% when frequencies of the X-ray intensities are integrated from the small X-ray intensity (low concentration) side in a frequency distribution of the X-ray intensity of a component element constituting an inorganic ion-adsorbing material as determined by subjecting a cut cross-section of a formed article to a plane analysis by an electron probe microanalyzer (EPMA).

Similarly, the 95% relative cumulative X-ray intensity is a value of an X-ray intensity at which the cumulative total of frequencies of X-ray intensities reaches 95% when frequencies of the X-ray intensities are integrated from the small X-ray intensity (low concentration) side in a frequency distribution of the X-ray intensity of a component element constituting an inorganic ion-adsorbing material as determined by subjecting a cut cross-section of a formed article to a plane analysis by an electron probe microanalyzer (SPMA).

The relative cumulative X-ray intensity ratio is determined by the following expression using the 95% relative cumulative X-ray intensity and the 5% relative cumulative X-ray intensity thus determined.

Relative cumulative X-ray intensity ratio=a 95% relative cumulative X-ray intensity/a 5% relative cumulative X-ray intensity With respect to the dispersion state of an inorganic ion-adsorbing material carried on the porous formed article according to the present embodiment, the ratio (relative cumulative X-ray intensity ratio) of a 95% relative cumulative X-ray intensity to a 5% relative cumulative X-ray intensity is preferably 1 to 10.

If the relative cumulative X-ray intensity ratio is 1 to 10, the inorganic ion-adsorbing material of the porous formed article exhibits a good dispersion state, and secondary aggregate of the inorganic ion-adsorbing material is little. Therefore, the contacting efficiency of the inorganic ion-adsorbing material with ions to be adsorbed becomes high, and the adsorbing performance can be held well. Further, since secondary aggregate of the inorganic ion-adsorbing material is little, the porous formed article is scarcely broken with the secondary aggregate as the starting point, and thus the durability is high.

The relative cumulative X-ray intensity ratio is preferably 1 to 7, and more preferably 1 to 5.

<Porosity of the Porous Formed Article>

The porosity Pr (%) of the porous formed article according to the present embodiment is preferably 50% to 95%, and more preferably 60 to 90%.

Here, the porosity Pr (%) is represented by the following expression where the mass of the porous formed article in a hydrous state is taken as W1 (g); the mass thereof after drying, as W0 (g); and the specific gravity thereof, as $\rho$.

$$Pr=(W1-W0)/(W1-W0+W0/\rho)\times 100$$

If the porosity is 50% or higher, the contacting frequency of substances to be adsorbed such as phosphorus and boron with an inorganic ion-adsorbing material as an adsorption substrate becomes sufficient; and if 95% or lower, the strength of a porous formed article becomes sufficient in practical use.

The mass (W1) in a hydrous state is determined by measuring a mass of a porous formed article after the porous formed article sufficiently wet with water is spread on a filter paper, and surplus moisture is removed.

The mass (W0) after drying is determined by measuring a mass of the porous formed article after the porous formed article is vacuum dried under room temperature.

The specific gravity ($\rho$) of a porous formed article can be simply measured using a pycnometer.

<Amount of an Inorganic Ion-Adsorbing Material Carried in the Porous Formed Article>

The amount of an inorganic ion-adsorbing material carried in the porous formed article according to the present embodiment is preferably 65 to 95%, more preferably 70 to 90%, and still more preferably 75 to 90%.

The amount of an inorganic ion-adsorbing material carried in a porous formed article is a value represented by the following expression where the mass of the porous formed article at dry is taken as Wd (g); and the mass of the ash content, as Wa (g).

Amount carried=$Wa/Wd\times 100$

Here, the ash content is determined as a residual content of the porous formed article according to the present embodiment when the porous formed article is fired at 800° C. for 2 hours.

In order to obtain a porous formed article having a high adsorbing performance, making large the amount of an inorganic ion-adsorbing material carried is preferable. However, if the amount of an inorganic ion-adsorbing material carried is made too large, the strength of the porous formed article is liable to be insufficient. The porous formed article according to the present embodiment can be obtained, as described later, by kneading the inorganic ion-adsorbing material and an organic polymeric resin, and forming the kneaded mixture. This method can provide a porous formed article having a large amount carried and a high strength.

<Volume-Based Specific Surface Area of the Porous Formed Article>

The volume-based specific surface area of the porous formed article according to the present embodiment can be defined by the following expression.

Volume-based specific surface area $(m^2/cm^3)=S_{BET}\times$ a bulk specific gravity $(g/cm^3)$ Here, $S_{BET}$ is a surface area ($m^2/g$) per unit mass of a formed article, and can be measured by BET method using a nitrogen gas as an adsorption gas after the porous formed article is vacuum dried at room temperature.

A method for measuring the bulk specific gravity will be described hereinafter. First, a porous formed article short in the shape of a particulate, cylindrical, hollow cylindrical shape or the like is brought in a wet state, and measured for an apparent volume using a measuring cylinder. Thereafter, the porous formed article is vacuum dried at room temperature, and the mass after the vacuum drying is determined. On the other hand, a porous formed article long in the shape of as a yarn, hollow yarn, sheet shape or the like is measured for the cross-section area and the length thereof in a wet state, and the volume is calculated from a product of the both. Thereafter, the porous formed article is vacuum dried at room temperature, and the mass thereof after the vacuum drying is determined.

Then, the bulk specific gravity, in the case of a porous formed article short in the shape of a particulate, cylindrical, hollow cylindrical shape or the like, is a value calculated from the mass after the vacuum drying/the apparent volume. On the other hand, in the case of a porous formed article long in the shape of a yarn, hollow yarn, sheet shape or the like, the bulk specific gravity is a value calculated from the mass after the vacuum drying/the volume.

The preferable range of the volume-based specific surface area of the porous formed article according to the present embodiment is 5 $m^2/cm^3$ to 500 $m^2/cm^3$. If the volume-based specific surface area is 5 $m^2/cm^3$ or larger, the amount carried and the adsorbing performance of the adsorbing substrate become sufficient in practical use. If the volume-based specific surface area is 500 $m^2/cm^3$ or smaller, the strength of the porous formed article becomes sufficient in practical use.

Generally, the adsorbing performance of an inorganic ion-adsorbing material being an adsorbing substrate is proportional to the volume-based specific surface area in many cases. Therefore, the larger the volume-based specific surface area (surface area per unit volume), the higher the adsorbing performance per unit volume, and the more easily a high-speed treatment and a high-capacity treatment are achieved when the inorganic ion-adsorbing material is packed in a column or a tank.

<Shape of the Porous Formed Article>

The shape of the porous formed article according to the present embodiment can be made into a particulate, cylindrical, hollow cylindrical, yarn, hollow yarn, sheet shape or the like by a forming step in a manufacturing method of the porous formed article as described later.

Particularly, in the case of using the porous formed article as an adsorbent in the water treatment field, the porous formed article is preferably of a particulate shape from the viewpoint of the pressure loss and the efficacy of the contacting area when the porous formed article is packed in a column or the like and water is passed therethrough, and from the viewpoint of the easy handleability; and especially a spherical particle (not only of a true sphere but of an ellipsoid sphere) is preferable.

When the porous formed article according to the present embodiment is made of a spherical body, the maximum length of the spherical particle is defined as a particle diameter, and the average thereof is defined as an average particle diameter.

The average particle diameter can be determined by observing the formed article surface by an electron microscope or a stereomicroscope, and actually measuring the image of the formed article surface. For example, in the case where the particle of a porous formed article is of a true sphere, its diameter is a particle diameter; and in the case where not being of a true sphere, its maximum length is a particle diameter.

"Spherical shape" suffices if the shape is regarded as a substantially nearly spherical shape, and does not require a completely true spherical shape.

A preferable range of the average particle diameter is 100 to 2,500 μm, and more preferably 200 to 2,000 μm. If the average particle diameter is 100 μm or larger, the pressure loss is suppressed when the porous formed article is packed in a column or a tank; and if the average particle diameter is 2,500 μm or smaller, the surface area when being packed in a column or a tank becomes large, and the treatment efficiency is raised.

For the case where the porous formed article is of a particulate shape other than a spherical body, the average particle diameter can also be determined by the method similar to that for the spherical body, and a preferable numerical range of the average particle diameter can be determined similarly.

[A Method for Manufacturing the Porous Formed Article]

A method for manufacturing the porous formed article according to the present embodiment comprises:

a crushing and mixing step of crushing and mixing a good solvent of the organic polymeric resin, the inorganic ion-adsorbing material and a water-soluble polymer so as to obtain a slurry;

a dissolving step of mixing and dissolving the organic polymeric resin in the slurry so as to obtain a slurry for forming; and a coagulating step of forming the slurry for forming and coagulating the slurry for forming in a poor solvent.

(A Method for Manufacturing an Organic Polymeric Resin)

First, a method for manufacturing an organic polymeric resin constituting a porous formed article will be described.

The organic polymeric resin is a polyether sulfone resin and/or a polysulfone resin, and is an organic polymeric resin having a hydroxyl group, as described above.

The organic polymeric resin according to the present embodiment can be manufactured usually by a commonly well-known method.

For example, the organic polymeric resin can be manufactured by polycondensating an alkaline metal compound, a dihalogenodiphenyl compound represented by the general formula (I) with divalent phenol compounds represented by the general formulae (II-1) and/or (II-2) in an organic solvent. Alternatively, the organic polymeric resin can also be manufactured by previously reacting divalent phenol compounds represented by the general formulae (II-1) and/or (II-2) with an alkaline metal compound, and polycondensating the reaction product with a dihalogenodiphenyl compound represented by the general formula (I).

[Formula 6]

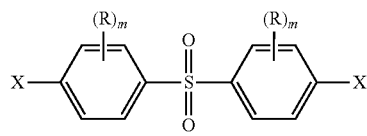
(I)

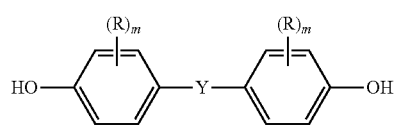
(II-1)

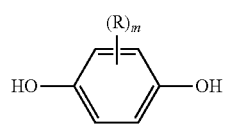
(II-2)

In the above formulae (I), (II-1) and (II-2), X denotes Cl or F; Rs are each a substituent for hydrogen of a benzene ring, may be identical or different from each other, and each denote an alkyl group having 1 to 6 carbon atoms or an aryl group having 6 to 8 carbon atoms; m denotes an integer of 0 to 3; and Y represents one selected from the group consisting of a direct bond, O, S, $SO_2$, CO, $C(CH_3)_2$, $CH(CH_3)$ and $CH_2$.

Examples of the compound represented by the above formula (I) include 4,4'-dichlorophenyl sulfone.

A polyether sulfone resin represented by the above formula (2) can be manufactured by using a compound in which Y is $SO_2$ (for example, 4,4'-dihydroxydiphenyl sulfone (bisphenol S)) as a compound represented by the above formula (II-1).

A polyaryl sulfone resin represented by the above formula (3) can be manufactured by using a compound in which Y is a direct bond (for example, 4,4'-biphenol) as a compound represented by the above formula (II-1).

A polysulfone resin represented by the above formula (4) can be manufactured by using a compound in which Y is $C(CH_3)_2$ (for example, 2,2-bis(4-hydroxyphenyl)propane (bisphenol A)) as a compound represented by the above formula (II-1).

The dihalogenodiphenyl compound is usually used equimolarly to the divalent phenol compound. In order to finely adjusting the molecular weight and the composition of the terminal group of an organic polymeric resin, the divalent phenol compound may be used in an amount slightly excessive or slightly insufficient from an equimolar amount.

Further, in order to adjust the molecular weight and the composition of the terminal group, a small amount of a monohalogenodiphenyl compound or monovalent phenol compound may be added to a polymerization solution.

Examples of an alkaline metal compound utilized for the polycondensation reaction include alkaline metal carbonates, alkaline metal hydroxides, alkaline metal hydrides and alkaline metal alkoxides. Above all, alkali metal carbonates such as potassium carbonate and sodium carbonate are preferable, and particularly anhydrous alkaline metal salts such as potassium carbonate anhydride and sodium carbonate anhydride are preferable.

Examples of an organic solvent utilized for the polycondensation reaction include the following. The organic solution may be made a mixture of two or more thereof.

The examples thereof include sulfoxide-based solvents such as dimethyl sulfoxide and hexamethylene sulfoxide; amide-based solvents such as N,N-dimethylformamide and N,N-dimethylacetamide; piperidone-based solvents such as N-methyl-2-pyrrolidone and N-methyl-2-piperidone; 2-imidazolinone-based solvents such as 1,3-dimethyl-2-imidazolidinone; diphenyl compounds such as diphenyl ether and diphenyl sulfone; halogen-based solvents such as methylene chloride, chloroform, dichloroethane, tetrachloroethane and trichloroethylene; lactone-based solvents such as α-butyrolactone; and sulfolane-based solvents such as sulfolane.

A very small amount of moisture in polymerization, moisture entering from the outside during reaction, and water generated in polymerization inhibit the progress of the polymerization. Therefore, in order to separate water in these reaction systems, a water-azeotropic solvent is preferably used. In the present embodiment, the water-azeotropic solvent is a solvent which compatibly dissolves in an aprotic polar solvent, and forms an azeotropic mixture with water at 0.101 MPa. The water-azeotropic solvent may be used in two or more kinds thereof.

Specific examples of the water-azeotropic solvent are not especially limited, but include the following.

The examples include hydrocarbon solvents such as pentane, hexane, heptane, octane, cyclohexane, dodecane, benzene, toluene, xylene, naphthalene and ethylbenzene; ether-based solvents such as diisopropyl ether, ethyl butyl ether and dioxane; ketone-based solvents such as acetylacetone and methyl ethyl ketone; alcohol-based solvents such as ethanol, isopropanol, n-propanol, isobutyl alcohol, hexanol and benzyl alcohol; ester-based solutions such as ethyl acetate, methyl acetate, butyl acetate, butyl butyrate and methyl benzoate; carboxylic acid solvents such as formic acid, acetic acid, propionic acid, valeric acid and benzoic acid; halogen-based solvents such as chloroform, bromoform, 1,2-dichloromethane, 1,2-dichloroethane, carbon tetrachloride, chlorobenzene and hexafluoroisopropanol; and amine-based solvents such as ethylenediamine, aniline, pyridine and methylpyridine.

The solvent is preferably hydrocarbon solvents, and more preferably at least one selected from benzene, toluene and xylene.

The amount of a water-azeotropic solvent used is not especially limited as long as being an amount capable of removing moisture in the system, but is preferably in the range of masses 0.01 to 10 times the mass of the whole monomer (compounds represented by the formulae (I), (II-1) and (II-2), and the like), and more preferably 0.02 to 5 times.

The reaction temperature of the polycondensation reaction, although depending on properties of an organic solution to be used, is usually preferably 140 to 340° C. If the polycondensation is carried out at a temperature higher than 340° C., since the decomposition reaction of a produced polymer progresses, it is likely that a high-molecular weight polymer and a high-purity organic polymeric resin cannot be obtained; and if the polycondensation is carried out at a temperature lower than 140° C., it is likely that a high-molecular weight polymer cannot be obtained.

The reaction time varies largely depending on the kinds of reaction raw material components, the type of the polymerization reaction, and the reaction temperature, but is usually in the range of 10 min to 100 hours, and preferably in the range of 30 min to 24 hours. The reaction atmosphere is preferably one in which oxygen is not present, and preferably one in which nitrogen or another inert gas is present. This is in order to suppress the oxidation of an alkaline metal salt of a divalent phenol compound produced in the polymerization process by heating thereof in the presence of oxygen. If the alkaline metal salt of a divalent phenol compound is oxidized, the oxidation inhibits the polymerization reaction aimed at, and makes the molecular weight elevation difficult and additionally causes the coloration of a polymer. Therefore, the reaction atmosphere is preferably an inert gas atmosphere.

In the polycondensation reaction, at the completion of the polymerization, a suitable terminal terminator, for example, a monofunctional chloride or polyfunctional chloride such as methyl chloride, t-butyl chloride or 4,4'-dichlorodiphenyl sulfone is added to a reaction solution as a terminal terminator of a polymer. By carrying out the reaction at this time at a temperature of 90 to 150° C., the terminals can be blocked.

In the case of using methyl chloride as a terminal terminator, an organic polymeric resin has a methyl group. In the case of using t-butyl chloride, it has a t-butyl group. In the case of using 4,4'-dichlorodiphenyl sulfone, it has a chloro group; and in the case of using p-tert-butylphenol, it has a t-butyl group.

An organic polymeric resin obtained by the polycondensation reaction is separated from a reaction solution containing an alkaline metal compound and the like used in the reaction. Specifically, a poor solvent of the organic polymeric resin (a polyether sulfone resin or a polysulfone resin) is added to the reaction solution, or the reaction solution is added to the poor solvent, and the organic polymeric resin can be separated as a deposited solid. Before the deposition using the poor solvent, the alkaline metal compound may previously be removed by filtration or centrifugal separation of the reaction solution.

Examples of the poor solvent of the organic polymeric resin according to the present embodiment include alcohols such as methanol, ethanol, isopropanol and butanol, nitriles such as acetonitrile, and water. These poor solvents may be used as a mixture of two or more thereof. A good solvent of the organic polymeric resin, such as an organic solvent, used in the polymerization reaction may be contained in the poor solvent, in such a range that the organic polymeric resin can be deposited.

Then, the deposited solid is cleaned with a poor solvent, and thereafter dried to obtain a powder of the organic polymeric resin.

<A Method for Regulating the Amount of the Terminal Hydroxyl Group>

The organic polymeric resin constituting the porous formed article according to the present embodiment has a hydroxyl group, and preferably has 5 to 100 mol % of a hydroxyl group at a terminal thereof. The amount of the terminal hydroxyl group of the organic polymeric resin can be regulated by using the organic polymeric resin manufactured by the above-mentioned method as a raw material and heating a divalent phenol compound and a basic compound in an aprotic polar solvent.

The divalent phenol compound used for a reaction (hereinafter, referred to as the reaction) to regulate the amount of the terminal hydroxyl group is represented by the following formulae (b-1) and/or (b-2).

[Formula 7]

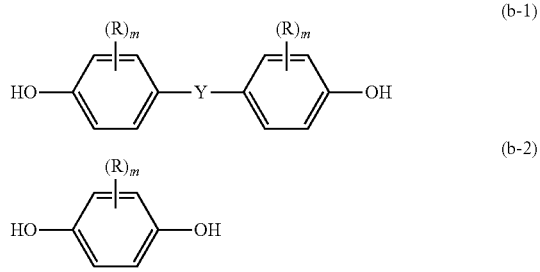

Rs in the above formulae (b-1) and (b-2) are each a substituent of a benzene ring, and may be identical or different from each other, and denote one selected from the group consisting of an alkyl group having 1 to 6 carbon atoms and an aryl group having 6 to 8 carbon atoms; and m denotes an integer of 0 to 3.

Y in the above (b-1) denotes one selected from a direct bond, O, S, $SO_2$, CO, $C(CH_3)_2$, $CH(CH_3)$ and $CH_2$.

Examples of the divalent phenol compound as described above include the following.

The examples thereof include bis(4-hydroxyphenyl)alkanes such as hydroquinone, catechol, resorcinol, 4,4'-biphenol, 2,2-bis(4-hydroxyphenyl)propane, 2,2-bis(4-hydroxyphenyl)methane and 2,2-bis(4-hydroxyphenyl)ethane; dihydroxydiphenyl sulfones such as 4,4'-dihydroxydiphenyl sulfone; and dihydroxyphenyl ethers such as 4,4'-dihydroxydiphenyl ether, and may be structural isomers thereof.

Among these, from the viewpoint of the availability, practicability and costs, preferable are hydroquinone, 4,4'-biphenol, 4,4'-dihydroxydiphenyl sulfone (bisphenol-S), 2,2-bis(4-hydroxyphenyl)propane (bisphenol-A), bis(4-hydroxyphenyl)methane (bisphenol-F), 4,4'-ethylidenebisphenol (bisphenol-E), 4,4'-dihydroxydiphenyl ether and 4,4'-dihydroxydiphenyl sulfone.

More preferable are 4,4'-dihydroxydiphenyl sulfone (bisphenol-S), 2,2-bis(4-hydroxyphenyl)propane (bisphenol-A), bis(4-hydroxyphenyl)methane (bisphenol-F) and 4,4'-ethylidenebisphenol (bisphenol-E).

Still more preferable are 4,4'-dihydroxydiphenyl sulfone (bisphenol-S) and 2,2-bis(4-hydroxyphenyl)propane (bisphenol-A).

By controlling the amount of the above-mentioned divalent phenol compound added, the amount of the terminal hydroxyl group of an organic polymeric resin to be finally obtained and the molecular weight of the organic polymeric resin can be controlled.

In order to progress the reaction so that the amount of the terminal hydroxyl group of an organic polymeric resin becomes a fixed amount, the amount of the divalent phenol compound added is preferably 0.001 to 2 mol times, more preferably 0.01 to 1.5 mol times, still more preferably 0.01 to 1 mol time, and further still more preferably 0.01 to 0.5 mol time, with respect to 1 mol of the organic polymer. The molar number of an organic polymer is calculated based on the molecular weight of one repeating unit.

If the amount of a divalent phenol compound added is 2 mol times or more, since the molecular weight of an obtained organic polymeric resin having a hydroxyl group becomes too small, the recovery and cleaning thereof not only becomes difficult, but it is also likely that an unreacted divalent phenol compound or salt thereof exhibiting an acidity, or a basic compound itself remains in the organic polymeric resin, and the organic polymeric resin is colored. Particularly, since along with an increase in the amount of the terminal hydroxyl group incorporated, the solubility of the organic polymeric resin and the interaction between it and the basic compound increase, cleaning, recovery and separation are likely to become difficult. By contrast, if the amount added is 0.001 mol time or less, the incorporation of a fixed amount of the terminal hydroxyl group becomes difficult.

In the reaction, in order to improve the reaction velocity, a basic compound is added to the reaction system. Examples of the basic compound include alkaline metal compounds such as sodium hydroxide, potassium hydroxide, lithium hydroxide, rubidium hydroxide, cesium hydroxide, sodium acetate, potassium acetate, sodium hydrogencarbonate, potassium hydrogencarbonate, lithium hydrogencarbonate, sodium carbonate, potassium carbonate, lithium carbonate, cesium carbonate, anhydrous potassium carbonate and anhydrous sodium carbonate; alkaline earth metal compounds such as calcium hydroxide, magnesium hydroxide, calcium hydrogencarbonate, barium hydrogencarbonate, magnesium hydrogencarbonate and calcium carbonate; quarternary ammonium salts such as tetramethylammonium hydroxide and tetraethylammonium hydroxide; tertiary amines such as trimethylamine and triethylamine; secondary amines such as N,N-dimethylamine and N,N-diethylamine; primary amines such as N-methylamine and N-ethylamine; and ammonia. These may be used in two or more kinds.

Among these, from the viewpoint of easy handleability, more preferable are sodium hydroxide, potassium hydroxide, sodium carbonate, potassium carbonate, anhydrous sodium carbonate and anhydrous potassium carbonate, and still more preferable are sodium carbonate, potassium carbonate, anhydrous sodium carbonate and anhydrous potassium carbonate.

The amount of a basic compound added is preferably 0.1 to 3 mol times, and more preferably 0.5 to 1 mol time, with respect to 1 mol of the divalent phenol compound to be used. If the amount of a basic compound added exceeds 3 mol times with respect to 1 mol of a divalent phenol compound, since the molecular weight of an obtained organic polymeric resin having a terminal hydroxyl group becomes too small, the recovery and cleaning thereof not only becomes difficult, but it is also likely that a divalent phenol compound or salt thereof exhibiting an acidity, and further the basic compound itself remain in the polymer, and the organic polymeric resin is colored. If the molecular weight of the organic polymeric resin is too small, it is also likely that the heat resistance, mechanical properties and the like intrinsic to the organic polymeric resin are damaged. By contrast, if the amount added is less than 0.1 mol time, the incorporation of a reactive terminal hydroxyl group becomes difficult.

In order to quantitatively progress the reaction, as a solvent for the reaction, an aprotic polar solvent is preferably used.

Examples of the aprotic polar solvent include dimethyl sulfoxide, N,N-dimethylformamide (DMF), N,N-dimethylacetamide, N-methyl-2-pyrrolidone (NMP), N-methyl-2-piperidone, 1,3-dimethyl-2-imidazolidinone, and a mixture of two or more thereof. Dimethyl sulfoxide, DMF and NMP are preferable.

The amount of an aprotic polar solvent added which is used in the reaction is not especially limited as long as being an amount of dissolving an organic polymeric resin and a divalent phenol compound, but is preferably in the range of 0.5 to 20 mass times, and more preferably 2 to 10 mass times, with respect to a mass of the whole monomer (an organic polymeric resin, a divalent phenol compound and the like). If the amount added is less than 0.5 times, an organic polymeric resin and a divalent phenol compound as raw materials are not dissolved, and operations during reaction such as stirring become difficult, making a homogeneous reaction difficult. By contrast, if the solvent amount exceeds 20 times, the concentrations of the organic polymeric resin and the divalent phenol compound decrease, and it is likely that the reaction velocity is retarded, and the generation of reprecipitation, cleaning and recovery become difficult, and particularly the increase in the solvent amount affects a decrease in the production amount and the solvent recovery cost.

Although it is important that the reaction is carried out in an aprotic polar solvent, as the case may be, an organic solvent other than the aprotic polar solvent can be used concurrently. A very small amount of moisture contained in raw materials, moisture entering from the outside during the reaction, bound water of a basic compound to be used, moisture in the basic compound aqueous solution, moisture in preparation of the basic compound, and other moistures are mingled in the reaction system. The hydrolysis due to these moistures sometimes progresses, and the nucleophilic substitution reaction of an organic polymeric resin and a divalent phenol compound, which is an objective reaction, is inhibited in some cases. Therefore, in order to separate moisture in the reaction system, as the organic solvent, an organic solvent forming an azeotropic mixture with water is preferably used. Particularly, an organic solvent is preferable which is compatible with an aprotic polar solvent, and forms an azeotropic mixture with water at 0.101 MPa.

Such an organic solvent is not especially limited, but examples thereof include the following. The organic solvent may be used in two or more kinds.

The examples thereof include hydrocarbon solvents such as pentane, hexane, heptane, octane, cyclohexane, dodecane, benzene, toluene, xylene, naphthalene and ethylbenzene; ether-based solvents such as diisopropyl ether, ethyl butyl ether and dioxane; ketone-based solvents such as acetylacetone and methyl ethyl ketone; alcohol-based solvents such as ethanol, isopropanol, n-propanol, isobutyl alcohol, hexanol and benzyl alcohol; ester-based solutions such as ethyl acetate, methyl acetate, butyl acetate, butyl butyrate and methyl benzoate; carboxylic acid solvents such as formic acid, acetic acid, propionic acid, valeric acid and benzoic acid; halogen-based solvents such as chloroform, bromoform, 1,2-dichloromethane, 1,2-dichloroethane, carbon tetrachloride, chlorobenzene and hexafluoroisopropanol; and amine-based solvents such as ethylenediamine, aniline, pyridine and methylpyridine. The solvent is preferably hydrocarbon solvents, and more preferably benzene, toluene and xylene.

The amount of a water-azeotropic solvent used is not especially limited as long as being an amount capable of removing moisture in the system, but is preferably in the range of masses 0.01 to 10 times the mass of the whole monomer (an organic polymeric resin, a divalent phenol compound, and the like), and more preferably 0.02 to 5 times.

The heating temperature in the reaction, although depending on the kinds of the solvent to be used, the boiling point of the solvent, the concentration of a reaction solution, the amount of a divalent phenol compound added, and the amount of a basic compound added, is usually preferably 100 to 250° C., and more preferably 100 to 200° C.

If the reaction is carried out at a temperature higher than 250° C., because of the progress of the thermal decomposition of the divalent phenol compound, and the thermal decomposition of the organic polymeric resin itself having a terminal hydroxyl group, which is produced in the reaction system, it is likely that it becomes difficult to control the molecular weight and control the amount of the terminal hydroxyl group incorporated, and a decrease in the thermal stability and residence stability of the finally obtained organic polymeric resin having a terminal hydroxyl group, and coloring thereof are observed. By contrast, if the reaction is carried out at a temperature lower than 100° C., the reaction is retarded.

The time required for the reaction varies largely depending on the kind and the amount of a divalent phenol compound added, the kind and the amount of a basic compound added, the reaction concentration and the reaction temperature, but is usually in the range of 10 min to 10 hours, and preferably in the range of 30 min to 5 hours.

The reaction atmosphere is preferably one in which oxygen is not present, and the reaction in nitrogen or another inert gas brings about a good result. A basic compound of a divalent phenol compound is easily oxidized when being heated in the presence of oxygen, and the objective reaction is inhibited, resulting in that it becomes difficult to control the molecular weight and control the amount of the terminal hydroxyl group incorporated, and additionally, the coloring of a polymer is caused.

<Separation of an Organic Polymeric Resin Having a Terminal Hydroxyl Group>

Through the reaction to regulate the amount of the above-mentioned terminal hydroxyl group, an organic polymeric resin is obtained which has a suitable amount of the terminal hydroxyl group.

This organic polymeric resin is separated from a reaction solution containing a basic compound and the like used in the reaction. Specifically, a poor solvent of the organic polymeric resin (a polyether sulfone resin or a polysulfone resin) is added to the reaction solution, or the reaction solution is added to the poor solvent, and the organic polymeric resin can be separated as a deposited solid. Before the deposition using the poor solvent, the basic compound may previously be removed by filtration or centrifugal separation of the reaction solution.

Examples of the poor solvent of the organic polymeric resin according to the present embodiment include alcohols such as methanol, ethanol, isopropanol and butanol, nitriles such as acetonitrile, and water. These poor solvents may be used as a mixture of two or more thereof.

A good solvent of the organic polymeric resin, such as an organic solvent, used in the polymerization reaction may be contained in the poor solvent, in such a range that the organic polymeric resin can be deposited.

In one of the steps, contacting an acid is preferable. A step of the contacting is not especially limited, but preferably in one step during the deposition by a solution or a poor solvent after the reaction, or after the recovery, an organic polymeric resin and an acid are brought into contact, and thereby an alkaline metal salt contained in the organic polymeric resin can efficiently be removed.

The acid to be used is not especially limited, but includes the following, and a mixed acid of two or more may be used.

The acids include inorganic acids such as hydrochloric acid, nitric acid, sulfuric acid, phosphoric acid, perchloric acid, sulfurous acid, chromic acid, hypochlorous acid, perchloric acid, hydrogen cyanide, hydrobromic acid and boric acid, and organic acids such as acetic acid, formic acid, oxalic acid, tartaric acid, stearic acid, naphthenic acid, picric acid and malic acid.

The amount of an acid used is not especially limited because being affected by the solubility in a solvent used in the reaction, and the like, but is preferably in the range of 0.001 to 2 mol times, and more preferably 0.01 to 1 mol time, with respect to 1 mol of an organic polymer. In the case where the amount of an acid is smaller than the above-mentioned range, the alkaline metal salt cannot be sufficiently removed, which is not preferable.

The organic polymeric resin after the contacting an acid is cleaned with a poor solvent, and then dried to obtain an organic polymeric resin.

(A Crushing and Mixing Step of Crushing and Mixing a Good Solvent of an Organic Polymeric Resin, the Inorganic Ion-Adsorbing Material, and a Water-Soluble Polymer so as to Obtain a Slurry)

In the crushing and mixing step, a good solvent of an organic polymeric resin, the inorganic ion-adsorbing material, and a water-soluble polymer are crushed and mixed to obtain a slurry. By wet crushing the inorganic ion-adsorbing material in a good solvent of the organic polymeric resin, the inorganic ion-adsorbing material can be microparticulated.

In the crushing and mixing step, further by adding a water-soluble polymer, the water-soluble polymer functions as a dispersion aid of the inorganic ion-adsorbing material, improves the efficacy of the crushing, and further functions to prevent reaggregation of the inorganic ion-adsorbing material. As a result, the inorganic ion-adsorbing material carried on a porous formed article after forming exhibits little secondary aggregation.

Here, the mechanism by which a water-soluble polymer functions as a dispersion aid will be described.

A water-soluble polymer is adsorbed on the surface of a solid particle of an inorganic ion-adsorbing material, and thereby the wettability of the inorganic ion-adsorbing material to a good solvent of an organic polymeric resin improves. The improvement of wettability replaces the air in the aggregate of the inorganic ion-adsorbing material by a liquid, and loosens the aggregated inorganic ion-adsorbing material in the good solvent. As a result, the dispersion state of the solid particle of the inorganic ion-adsorbing material becomes good.

Since a water-soluble polymer having a high molecular weight has a high bulkiness, an adsorption layer of the water-soluble polymer is formed on the surface of the solid particle of the inorganic ion-adsorbing material. Thereby, the repulsive force between the particles is raised by an increase in the charge of the surface of the solid particle, and the steric hindrance. As a result, the dispersion state of the solid particle of the inorganic ion-adsorbing material becomes good.

Because the dispersion state of the solid particle of the inorganic ion-adsorbing material becomes good, the secondary aggregate of the inorganic ion-adsorbing material in a porous formed article becomes little when the porous formed article is made. Therefore, all the inorganic ion-adsorbing material used for the preparation is homogeneously dispersed in the porous formed article, and all thereof participates in the adsorption effectively, and the contacting efficiency with substances to be adsorbed becomes remarkably high. Since the secondary aggregate of the inorganic ion-adsorbing material is little, the porous formed article is scarcely broken with the secondary aggregate as the starting point, and thus the durability improves.

The water-soluble polymer further has an enhancing effect on porousness of a formed article in addition to an effect as a dispersant as described above.

The method for manufacturing a porous formed article according to the present embodiment, since using a water-soluble polymer in the crushing and mixing step, has a large contributing effect on the performance and the easiness of manufacture of the porous formed article. Specifically, since the crushing and dispersing efficiency becomes high, the crushing time can be shortened. Further, it can be said that the stability of the slurry improves, and the inorganic ion-adsorbing material scarcely precipitates even in a long-period preservation.

<A Good Solvent of the Organic Polymeric Resin>

A good solvent of the organic polymeric resin used in the manufacturing method of a porous formed article according to the present embodiment is not especially limited as long as the good solvent can dissolve more than 1% by mass of the organic polymeric resin in the manufacturing condition of the formed article, and conventional well-known ones can be used. Examples thereof include N-methyl-2-pyrrolidone (NMP), N,N-dimethylacetoamide (DMAC) and N,N-dimethylformamide (DMF). These may be used singly or as a mixture of two or more thereof.

<The Water-Soluble Polymer>

The water-soluble polymer used in the manufacturing method of a porous formed article according to the present embodiment is not especially limited as long as having compatibility with a good solvent of an organic polymeric resin and the organic polymeric resin.

Any water-soluble polymers of natural polymers, semisynthetic polymers and synthetic polymers can be used.

Examples of the natural polymer include guar gum, locust bean gum, carrageenan, gum arabic, tragacanth, pectin, starch, dextrin, gelatin, casein and collagen.

Examples of the semisynthetic polymer include methyl cellulose, ethyl cellulose, hydroxyethyl cellulose, ethyl hydroxyethyl cellulose, carboxymethyl starch and methyl starch.

Examples of the synthetic polymer include polyvinyl alcohol, polyvinyl pyrrolidone, polyvinyl methyl ether, carboxyvinyl polymer and sodium polyacrylate, and further polyethylene glycols such as tetraethylene glycol and triethylene glycol.

Among the above-mentioned water-soluble polymers, synthetic polymers are preferable from the viewpoint of enhancing the carrying property of an inorganic ion-adsorbing material, and polyethylene glycols are more preferable from the viewpoint of improving porousness.

The weight-average molecular weight of the polyethylene glycol is preferably in the range of 400 to 35,000,000, more preferably 1,000 to 1,000,000, and still more preferably 2,000 to 100,000. If the weight-average molecular weight is 2,000 or higher, a porous formed article having a high surface opening property can be obtained; and if 1,000,000 or lower, since the viscosity is low in the time of forming, forming is likely to become easy. The weight-average molecular weight can be measured by dissolving a polyethylene glycol in a predetermined solvent and using the gel permeation chromatography (GPC) analysis.

The amount of a water-soluble polymer added is preferably so that the proportion of a water-soluble polymer/(the water-soluble polymer+an organic polymeric resin+a good solvent of the organic polymeric resin) is 0.1 to 40% by mass. If the amount of a water-soluble polymer added is 0.1% by mass or more, a porous formed article is uniformly obtained which contains a fibrous structure forming a three-dimensional continuous network structure on the outer surface of and in the interior of the porous formed article. If 40% by mass or less, a porous formed article having a high strength is obtained. The amount added is more preferably 0.5 to 30% by mass, and still more preferably 1 to 20% by mass.

<A Dispersant>

In the crushing and mixing step, a well-known dispersant such as a surfactant may be added in the range of not affecting the structure of the porous formed article.

<Crushing and Mixing Means>

Crushing and mixing means in the crushing and mixing step is not especially limited as long as being capable of crushing and mixing collectively an inorganic ion-adsorbing material, a good solvent of an organic polymeric resin, and a water-soluble polymer. For example, physical crushing methods can be used, such as pressurizing-type breaking, mechanical milling, ultrasonic treatment and a homogenizer. Specific examples thereof include a generator shaft-type homogenizer, a blender such as a Waring blender, a crusher such as a sand mill or a ball mill, a jet mill, a mortar and pestle, a grinder, and means such as ultrasonic treatment.

Agitated media mills are preferable, such as a ball mill, an attritor and a bead mill, because these have a high crushing efficiency and can crush high-viscosity materials. A bead mill is more preferable from the viewpoint of capable of crushing and mixing an inorganic ion-adsorbing material to a fine particle diameter in the nano region. The ball diameter used for the bead mill is not especially limited, but is preferably in the range of 0.1 to 2 mm. With the diameter of 0.1 mm or larger, since the ball mass is sufficient, the bead mill has a crushing power and a high crushing efficiency; and with the diameter of 2 mm or smaller, the capability of fine crushing is excellent.

The material of the ball used for the bead mill is not especially limited, but includes metal types such as iron and stainless steel, oxides such as alumina and zirconia, and various types of ceramics of non-oxides such as silicon nitride and silicon carbide. Particularly, zirconias are excellent from the viewpoint of being excellent in wear resistance, and imparting little contamination (mingling of wear substances) to products.

(A Dissolving Step of Mixing and Dissolving the Organic Polymeric Resin in the Slurry so as to Obtain a Slurry for Forming)

In a dissolving step, by mixing and dissolving the organic polymeric resin in the slurry obtained in the crushing and mixing step, a slurry for forming is obtained.

Here, the amount of the organic polymeric resin added is preferably so that the proportion of the organic polymeric resin/(the organic polymeric resin+the water-soluble polymer+a good solvent of the organic polymeric resin) is 5 to 40% by mass. If the content of the organic polymeric resin is 5% by mass or more, a porous formed article having a strength is obtained; and if 40% by mass or less, a porous formed article having a high porosity is obtained. The content is more preferably 7 to 30% by mass.

(A Coagulating Step of Coagulating the Slurry for Forming in a Poor Solvent>

In the coagulating step, the slurry for forming obtained in the dissolving step is coagulated in a poor solvent, and formed to obtain a porous formed article.

<A Poor Solvent>

As a poor solvent used in a step of coagulating the slurry for forming obtained in the dissolving step, in the poor solvent, solvents can be used which have a solubility of an organic polymeric resin of 1% by mass or lower in the condition of the coagulating step, and include liquids which do not dissolve the organic polymeric resin, the liquids including, for example, water, alcohols such as methanol and ethanol, ethers, and aliphatic hydrocarbons such as n-hexane and n-heptane. Preferable is water.

In the coagulating step, the good solvent is carried in from the preceding step, and the concentration of the good solvent varies at the starting time and at the finishing time of the coagulating step. Therefore, a coagulating method is preferably employed in which a good solvent is previously added to a poor solvent, and the concentration is controlled while the poor solvent is separately being added so as to maintain the initial concentration. The concentration regulation in such a way can control the structure (opening degree of the surface, particle shape) of a porous formed article. In the case where a poor solvent is water, in the coagulating step, the content of an organic polymeric resin to water is preferably 0 to 60% by mass, and more preferably 0 to 50% by mass. If the content of a good solvent of an organic polymeric resin is 60% by mass or lower, an effect is attained in which the shape of a porous formed article becomes good.

Additionally, by controlling the amount and the rate of addition of a good solvent of an organic polymeric resin to a poor solvent, the coagulation velocity of a slurry for forming can also be controlled.

The temperature of a poor solvent is not especially limited, but is preferably $-30°$ C. to $90°$ C., more preferably $0°$ C. to $90°$ C., and still more preferably $0°$ C. to $80°$ C., from the viewpoint of the stability of the state of a formed article in the poor solvent.

The form of the porous formed article according to the present embodiment is employed optionally from a particulate, yarn, sheet, hollow yarn, cylindrical, or hollow cylindrical shape, depending on the method of forming a slurry for forming.

A method of forming, for example, a particulate porous formed article is not especially limited, but includes a rotating nozzle method in which a slurry for forming contained in a container is scattered from a nozzle provided on the side surface of the rotating container to form liquid droplets. More specifically, the method includes a method in which a slurry for forming (a mixed slurry of an organic polymeric resin, a good solvent of the organic polymeric resin, an inorganic ion-adsorbing material and a water-soluble polymer) is sprayed from one fluid nozzle or two fluid nozzles to be coagulated in a coagulation bath. The rotating nozzle method is particularly preferable from the viewpoint of providing particulate porous formed articles exhibiting the uniform particle distribution. The rotating nozzle method refers to a method in which a slurry for forming is scattered by a centrifugal force from a nozzle provided on the side surface of a rotating container rotating at a high speed to form liquid droplets.

At this time, the diameter of the nozzle is preferably in the range of 0.1 mm to 10 mm, and more preferably 1 mm to 5 mm. If the diameter is made 0.1 mm or larger, the liquid droplets easily scatter; and if 10 mm or smaller, the widening of the particle distribution can be suppressed.

The centrifugal force is expressed by a centrifugal acceleration, and is preferably in the range of 5 to 1,500 G, more preferably 10 to 1,000 G, and still more preferably 10 to 800 G. If the centrifugal force is 5 G or larger, the formation and scattering of liquid droplets are easy; and if 1,500 G or lower, since a polymer slurry is discharged without becoming of a yarn shape, widening of the particle distribution can be suppressed.

A method of forming a porous formed article of a yarn or sheet shape includes one in which a slurry for forming is extruded from a corresponding spinneret or die, and coagulated in a poor solvent.

In the case where a hollow yarn-shaped formed article is made, the formed article can be made similarly by using a spinneret composed of an annular orifice.

In the case where a cylindrical and a hollow cylindrical-shaped formed article are made, when a slurry for forming is extruded from a spinneret, the slurry may be coagulated in a poor solvent while being cut, or may be coagulated into a yarn shape, and thereafter cut.

[Applications of the Porous Formed Article]

The porous formed article according to the present embodiment can be used mainly for the water treatment application. In the water treatment application, the porous formed article can suitably be utilized particularly as an adsorbent of ions such as phosphorus, boron, arsenic and fluorine. Among these ions, utilization as a phosphorus adsorbent is more suitable.

The porous formed article according to the present embodiment has features of having the communicating pores developing as a three-dimensional network in the interior thereof, exhibiting a high contacting efficiency, and having a high chemical resistance to an oxidizing agent and the like.

The porous formed article is used, by making the best use of the high contacting efficiency as described above, for the water treatment application, and additionally for various types of adsorbents, deodorants, antimicrobials, moisture adsorbents, freshness preservatives of foods, enzyme-immobilizing carriers, carriers of chromatography, and the like.

For example, in the case of using zeolite as an inorganic ion-adsorbing material, a deodorizing effect can be expected. Further, in the case where an inorganic ion-adsorbing material of the porous formed article according to the present embodiment is zeolite, and silver is further carried on the zeolite, the inorganic ion-adsorbing material exhibits the antimicrobial property. Further, in the case where palladium or platinum is carried, the inorganic ion-adsorbing material adsorbs ethylene, and can thereby be used as a freshness preservative. Furthermore, in the case where silver or copper is carried, the inorganic ion-adsorbing material adsorbs and decomposes foul odor gases such as hydrogen sulfide, ammonia and methylmercaptane, and thereby has a deodoring effect.

In any case, the effect can be expected which makes the best use of the high contacting efficiency of the porous formed article according to the present embodiment and which is not exhibited in conventional technologies.

EXAMPLES

Hereinafter, the present invention will be described by way of specific Examples and Comparative Examples, but the present invention is not limited thereto.

Physical properties of formed articles were measured by the following methods.

[Terminal Hydroxyl Group Composition]

The terminal hydroxyl group composition was measured using a deuterated DMF solution of a sample concentration of 50 mg/g in an integration frequency of 512 by using a 1H-NMR (nuclear magnetic resonance) apparatus (JNM-LA400, made by JEOL Ltd.)

Two protons ($H_{Cl}$) adjacent to a chlorine-substituted aromatic carbon were observed at 7.7 ppm, and two protons ($H_{OH}$) adjacent to a hydroxyl group-substituted aromatic carbon were observed at 6.9 ppm. By using the peak area ratio thereof, the terminal hydroxyl group composition was calculated by the following relational expression.

[Terminal Hydroxyl Group Composition (mol %)]=[a peak area of $H_{OH}$]/([the peak area of $H_{OH}$]+[a peak area of $H_{Cl}$])×100

[Strength Retention]

20 mL of a porous formed article, weighed using a measuring cylinder, was charged in 1,000 mL of a sodium hypochlorite aqueous solution of a concentration of 500 mg/L, and immersed for 24 hours. After 24 hours, the porous formed article was taken out, and cleaned with pure water to prepare a test sample. The test sample was sieved using a sieve of a sieve opening of 300 μm so as to obtain a formed article in which substances of smaller than 300 μm had been removed.

10 mL of the porous formed article, weighed by a measuring cylinder, and 100 mL of pure water were put in a 100-mL-volume polyethylene container (diameter: about 50 mm), and shaken in a reciprocal shaking period of 250 rpm for 96 hours by a shaker. After the 96-hour shaking, the porous formed article was taken out from the container, and sieved by a sieve of a sieve opening of 300 μm and substances of smaller than 300 μm were collected as a crushed product.

The collected crushed product was dried in a vacuum drier, and the dry mass (Wh (g)) of the crushed formed article was determined. The strength retention of the porous formed article was calculated by the following expression from a bulk specific gravity (g/mL) separately determined of the porous formed article and the dry mass Wh.

Strength retention (%)=(a bulk specific gravity×10−Wh)/(the bulk specific gravity×10)×100

If the strength retention was 95% or higher, the porous formed article was judged to be good in the durability to repeating usage and an oxidizing agent in practical use. The strength retention is preferably 97% or higher.

[Relative Cumulative X-Ray Intensity Ratio]

The distribution state of the inorganic ion-adsorbing material in the porous formed article was measured by the plane analysis using an electron probe microanalyzer (EPMA) (EPMA1600, made by Shimadzu Corp.).

<Fabrication of a Sample for the Electron Probe Microanalyzer (EPMA)>

The porous formed article was vacuum dried at room temperature. The dried porous formed article was cut by a razor, and thereafter, osmium (Os) was vapor deposited. Then, the osmium-deposited porous formed article was embedded in an epoxy resin; a cross-section was fabricated by polishing; thereafter, and osmium (Os) was again vapor deposited to fabricate a sample for EPMA observing the interior of the porous formed article.

Plane analysis data (specifically, a frequency distribution of the X-ray intensity (count number)) acquired by the plane analysis using the measuring sample was statistically processed.

The 5% relative cumulative X-ray intensity was defined as a value of an X-ray intensity at which the cumulative total of frequencies of X-ray intensities reaches 5% when frequencies of the X-ray intensities are integrated from the small X-ray intensity (low concentration) side in a frequency distribution of the X-ray intensity of a component element constituting an inorganic ion-adsorbing material.

The 95% relative cumulative X-ray intensity was similarly defined as a value of an X-ray intensity at which the cumulative total of frequencies of X-ray intensities reaches 95% when frequencies of the X-ray intensities are integrated from the small X-ray intensity (low concentration) side in a frequency distribution of the X-ray intensity of a component element constituting an inorganic ion-adsorbing material.

The relative cumulative X-ray intensity ratio was determined by the following expression.

Relative cumulative X-ray intensity ratio=a 95% relative cumulative X-ray intensity/a 5% relative cumulative X-ray intensity

[Amount of the Inorganic Ion-Adsorbing Material Carried]

The porous formed article was vacuum dried at room temperature for 24 hours. The mass of the dried porous formed article was measured, and defined as a mass Wd (g) at dry of the porous formed article.

Then, the dried formed article was fired at 800° C. for 2 hours using an electric furnace, and the mass of the ash content was measured, and was defined as a mass Wa (g) of the ash content.

The amount of the inorganic ion-adsorbing material carried was determined by the following expression.

Amount of the inorganic ion-adsorbing material carried (%)=Wa/Wd×100

In the above expression, Wa is a mass (g) of the ash content of the porous formed article, and Wd is a mass (g) of the porous formed article at dry.

If the amount of the inorganic ion-adsorbing material carried was 65% or larger, the high-speed removing performance of hazardous substances was judged to be excellent.

[Volume-Based Specific Surface Area]

The porous formed article was vacuum dried at room temperature, and thereafter, the surface area $S_{BET}$ (m²/g) per unit mass of the porous formed article was determined by BET method using nitrogen as an adsorption gas by using a Coulter SA3100 (trade name), made by Beckman Coulter, Inc.

Then, the apparent volume V (cm³) of the porous formed article in a wet state was measured using a measuring cylinder or the like.

Thereafter, the porous formed article was vacuum dried at room temperature, and the dry mass W (g) of the porous formed article was determined.

The volume-based specific surface area of the porous formed article was determined by the following expression.

volume-based specific surface area (m²/cm³)=$S_{BET}$ (m²/g)×a bulk specific gravity (g/cm³)

Bulk specific gravity (g/cm³)=W/V

In the above expressions, $S_{BET}$ is a surface area (m²/g) per unit mass of the porous formed article; W is a dry mass (g) of the porous formed article; and V is an apparent volume thereof (cm³).

[Particle Diameter of the Inorganic Ion-Adsorbing Material]

The particle diameter of the inorganic ion-adsorbing material was measured by using a laser diffraction/scattering-type particle distribution analyzer (LA-950 (trade name), made by HORIBA Ltd.), and measuring the particle diameter distribution of the inorganic ion-adsorbing material and acquiring its median diameter (d50) as an average particle diameter.

[Average Particle Diameter of the Porous Formed Article]

The porous formed article surface was observed by a scanning electron microscope or a stereomicroscope. The observation of the formed article by a scanning electron microscope (SEM) used an S-800 scanning electron microscope, made by Hitachi, Ltd.

Using images of surfaces of the particles, the diameter thereof in the case of a particle in a true spherical shape, and the maximum length in the case of a particle in a shape other than a true spherical shape were measured as particle diameters. Averages of diameters or maximum lengths of 50 or more measured sample particles were calculated, and defined as an average particle diameter.

[Porosity of the Porous Formed Article]

The porous formed article sufficiently wet with water was spread on a filter paper, and surplus moisture is removed; and thereafter, the mass was measured, and defined as a mass (W1) at a hydrous state of the porous formed article.

Then, the porous formed article was vacuum dried at room temperature for 24 hours to obtain a dried porous formed article. The mass of the dried porous formed article was measured, and defined as a mass (W0) at dry of the porous formed article.

Then, a pycnometer (Gay-Lussac type, volume: 10 mL), was prepared, and the mass when the pycnometer was filled with pure water (25° C.) was measured, and defined as a mass (Ww) at full water.

Then, the porous formed article in a wet state with pure water was put in the pycnometer, and pure water was further filled to the gauge line, and the mass (Wwm) was measured.

Then, the porous formed article was taken out from the pycnometer and vacuum dried at room temperature for 24 hours to obtain a dried porous formed article. The mass (M) of the dried porous formed article was measured.

The specific gravity (ρ) and the porosity (Pr) of the porous formed article were determined by the following expressions.

$$\rho = M/(Ww+M-Wwm)$$

$$Pr = (W1-W0)/(W1-W0+W0/\rho) \times 100$$

In the above expressions, Pr is a porosity (%); W1 is a mass (g) at a hydrous state of the formed article; W0 is a mass (g) after drying of the formed article; ρ is a specific gravity (g/cm³) of the formed article; M is a mass (g) after drying of the formed article; Ww is a mass (g) at full water of the pycnometer; and Wwm is a mass (g) when the hydrous formed article and pure water were put in the pycnometer.

If the porosity of the porous formed article was 50% or higher, the porous formed article was judged to be excellent in the high-speed removal performance of hazardous substances; and if 95% or lower, the strength of the porous formed article was judged to be sufficient in practical use.

[Cutting of the Porous Formed Article]

The porous formed article was vacuum dried at room temperature, and the dried formed article was added to isopropyl alcohol (IPA) to impregnate the formed article interior with IPA.

Then, the formed article together with IPA was enclosed in a gelatin capsule of 5 mm in diameter, and frozen in liquid nitrogen.

The frozen porous formed article was cut together with the capsule by a carving knife.

The cut porous formed article was sorted, and provided for an observation sample by an electron microscope.

[Phosphorus Adsorption Amount]

Trisodium phosphate ($Na_3PO_4 \cdot 12H_2O$) was dissolved in distilled water to fabricate a liquid of a phosphorus concentration of 9 mg-P/L, and the liquid was adjusted to a pH of 7 by sulfuric acid to make an adsorption stock liquid.

8 mL of the porous formed article was packed in a column (inner diameter: 10 mm), and the adsorption stock liquid was passed therethrough at a rate of 240 mL/hr (SV30).

An effluent (treated liquid) from the column was sampled at every 30 min, and measured for the phosphate ion concentration (phosphorus concentration) in the treated water to determine a phosphorus adsorption amount (adsorption amount mg-P/L-porous formed article (R)) till over 0.5 mg-P/L (ppm).

The phosphate ion concentration was measured using a phosphoric acid measuring apparatus, Phosphax Compact (trade name), made by HACH Co.

If the phosphorus adsorption amount is 4.0 (g-P/L-porous formed article (R)) or larger, the porous formed article was judged to have a large adsorption capacity, and to be good as a phosphorus adsorbent.

[Turbidity of the Coagulation Bath]

In Examples 1 to 6 and Comparative Examples 1 and 2 as described later, a slurry for forming was discharged into a coagulation bath to coagulate the polymer slurry, and thereafter, the presence/absence of the turbidity of the coagulation bath was judged by whether or not a double-cross of a marker plate placed at the depth of 30 cm from the water surface of the coagulation bath could be distinguished.

For the distinction of the marker plate, a white plate was used on which a cross was drawn by a double line with a thickness of 0.5 mm and an interval of 1 mm; and the distinguishability was judged.

In the case where the carrying property of the inorganic ion-adsorbing material of the porous formed article was weak, white turbidity was generated in the coagulation bath. In the case where the carrying property of the inorganic ion-adsorbing material was weaker, the double-cross of the marker plate could not be distinguished due to the white turbidity.

Example 1

80 g of a polyethylene glycol (PEG35,000, Merk & Co., Ltd.) was dissolved in 4,400 g of N-methyl-2-pyrrolidone (NMP, Mitsubishi Chemical Corp.) to obtain a homogeneous solution. 2,000 g of a cerium oxide hydrate powder of 2.0 μm in average particle diameter (Iwatani Corp.) was added to 4,480 g of the solution, and subjected to a crushing and mixing treatment for 30 min using a bead mill (SC100, Mitsui Mining Co., Ltd.) packed with a zirconium ball of 0.8 mmϕ in diameter so as to obtain a yellow slurry.

600 g of a polyether sulfone resin having a hydroxyl group (Sumika Excel 5003PS (trade name), a grade having OH terminals, the terminal hydroxyl group composition: 90 (mol %), made by Sumitomo Chemical Co., Ltd.) was added to the slurry in a dissolving tank, heated at 60° C., and stirred and dissolved using stirring blades so as to obtain a homogeneous solution of a slurry for forming.

The obtained slurry for forming was heated at 40° C., and fed to the interior of a cylindrical rotating container on whose side surface a nozzle of 5 mm in diameter was opened; and the container was rotated and liquid droplets were formed from the nozzle by a centrifugal force (15 G), and discharged into 60° C. water in a 200-L-volume coagulation bath to coagulate the slurry for forming.

The slurry was further cleaned and classified to obtain a spherical porous formed article of 600 μm in average particle diameter.

The physical properties of the spherical porous formed article are shown in the following Table 1.

The strength retention was maintained at 99% or higher, revealing that the porous formed article had a high durability to the oxidizing agent.

The surface and the cut surface of the obtained porous formed article were observed using a scanning electron microscope (SEM). An electron microscopic photograph of a magnitude of 150× and an electron microscopic photograph of a magnitude of 10,000× are shown in FIG. 1 and FIG. 2, respectively.

It was found from FIG. 1 that the porous formed article of Example 1 had communicating pores, and had a porous structure. The observation of the whole cut surface further confirmed that the inorganic ion-adsorbing material was uniformly dispersed and carried.

Cerium (Ce) as a constituting element of the inorganic ion-adsorbing material was subjected to a plane analysis of the interior of the formed article by using an electron probe microanalyzer (EPMA). As a result of the analysis, the relative cumulative X-ray intensity ratio was 1.8.

Figure 2:
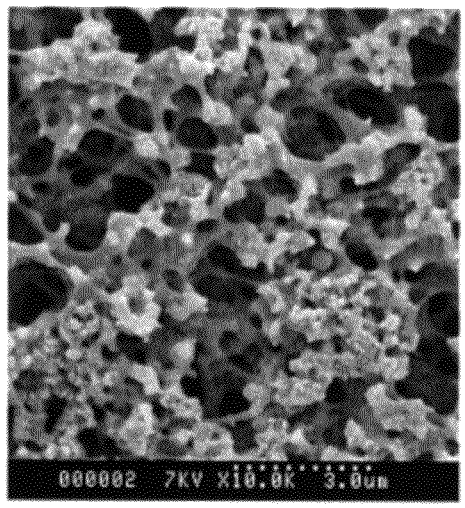
FIG. 2 shows an electron microscopic photograph (magnification: 10,000×) of a cut cross-section of a formed article of Example 1.

A state is observed from FIG. 2 in which the inorganic ion-adsorbing material was carried on the outer surface of and in the interior of a fibrous structure forming a three-dimensional continuous network structure in the outer surface of and in the interior of the porous formed article. It was thereby found that the dispersion state of the inorganic ion-adsorbing material in the porous formed article was good, and there was little secondary aggregate like so-called lumps; and the contacting efficiency of the inorganic ion-adsorbing material with ions to be adsorbed was large, and the adsorbing performance was good. It was also found that since there was little secondary aggregate of the inorganic ion-adsorbing material, the porous formed article was scarcely broken with the secondary aggregate as a starting point, and the durability was thereby high.

Example 2

540 g of a polyether sulfone resin having a hydroxyl group (Sumika Excel 5003PS (trade name), a grade having OH terminals, the terminal hydroxyl group composition: 90 (mol %), made by Sumitomo Chemical Co., Ltd.) and 60 g of a polyether sulfone resin having a terminal Cl group (Sumika Excel 5200P (trade name), the terminal hydroxyl group composition: 0 (mol %), made by Sumitomo Chemical Co., Ltd.) were mixed and used as an organic polymeric resin. The terminal hydroxyl group composition of the organic polymeric resin after the mixing was 81 mol %.

The other conditions were similar to in Example 1 to obtain a spherical porous formed article of 600 μm in average particle diameter.

The physical properties of the spherical porous formed article are shown in the following Table 1.

Example 3

60 g of a polyether sulfone resin having a hydroxyl group (Sumika Excel 5003PS (trade name), a grade having OH terminals, the terminal hydroxyl group composition: 90 (mol %), made by Sumitomo Chemical Co., Ltd.) and 540 g of a polyether sulfone resin having a terminal Cl group (Sumika Excel 5200P (trade name), the terminal hydroxyl group composition: 0 (mol %), made by Sumitomo Chemical Co., Ltd.) were mixed and used as an organic polymeric resin. The terminal hydroxyl group composition of the organic polymeric resin after the mixing was 9 mol %.

The other conditions were similar to in Example 1 to obtain a spherical porous formed article of 600 μm in average particle diameter.

The physical properties of the spherical porous formed article are shown in Table 1.

Example 4

540 g of a polyether sulfone resin having a hydroxyl group (Sumika Excel 5003PS (trade name), a grade having OH terminals, the terminal hydroxyl group composition: 90 (mol %), made by Sumitomo Chemical Co., Ltd.) and 60 g of a polysulfone resin having a terminal Cl group (Udel P-3500LCD (trade name), the terminal hydroxyl group composition: 0 (mol %), made by Solvay Advanced Polymers L.L.C.) were mixed and used as an organic polymeric resin. The terminal hydroxyl group composition of the organic polymeric resin after the mixing was 81 mol %.

The other conditions were similar to in Example 1 to obtain a spherical porous formed article of 600 μm in average particle diameter.

The physical properties of the spherical porous formed article are shown in Table 1.

Example 5

600 g of a polyether sulfone resin having a hydroxyl group (the terminal chlorine group/the terminal hydroxyl group=50/50 (mol %)) manufactured in the below (Manufacturing Example 1) was used as an organic polymeric resin. The terminal hydroxyl group composition of the organic polymeric resin was 50 mol %.

The other conditions were similar to in Example 1 to obtain a spherical porous formed article of 600 μm in average particle diameter.

The physical properties of the spherical porous formed article are shown in Table 1.

Manufacturing Example 1

<Synthesis of a Polyether Sulfone Resin of the Terminal Hydroxyl Group/the Terminal Chlorine Group=50/50 (mol %)>

4,4'-Dihydroxydiphenyl sulfone (hereinafter, abbreviated to DHDPS)(50.06 g, 0.20 mol), 100 mL of toluene, 1,3-dimethyl-2-imidazolidinone (250.8 g), and a 40% potassium hydroxide aqueous solution (56.0 g, 0.39 mol) were weighed in a 1-L four-necked flask equipped with a stirrer, a thermometer, a cooling device, a distillate separator and a nitrogen-introducing tube; and the reaction system atmosphere was wholly replaced by nitrogen by passing a nitrogen gas therethrough under stirring.

The reaction system was heated up to 130° C. while the nitrogen gas was being passed therethrough.

The reflux of toluene was initiated along with the rise of the temperature of the reaction system, and water in the reaction system was removed azeotropically with toluene to azeotropically dehydrate the reaction system at 130° C. for 4 hours while toluene was being returned to the reaction system.

Thereafter, 4,4'-dichlorodiphenyl sulfone (hereinafter, abbreviated to DCDPS) (57.40 g, 0.20 mol) and 40 g of toluene together were added to the reaction system, which was then heated at 150° C.

The reaction system was allowed to react for 4 hours while toluene was being distilled out, to obtain a high-viscosity brownish-red solution.

The reaction solution was cooled to room temperature, and was charged into 1 kg of methanol to thereby deposit a polymer powder.

The polymer powder was recovered by filtration; 1 kg of water was added thereto; and a 1N hydrochloric acid was further added so that the pH of the slurry solution became 3 to 4 to make the solution of acidity. After the polymer powder was recovered by filtration, the polymer powder was twice cleaned with 1 kg of water.

The polymer powder was further cleaned with 1 kg of methanol, and vacuum dried at 150° C. for 12 hours.

The obtained polymer powder was of a white powder shape, and the terminal group composition measured by 1H-NMR at 400 MHz was the terminal hydroxyl group/the terminal chlorine group=50/50 (mol %).

Example 6

600 g of a polysulfone resin having a hydroxyl group (the terminal hydroxyl group/the terminal chlorine group=50/50 (mol %)) manufactured by the below (Manufacturing Example 2) was used an organic polymeric resin. The terminal hydroxyl group composition of the organic polymeric resin was 50 mol %.

The other conditions were similar to in Example 1 to obtain a spherical porous formed article of 600 μm in average particle diameter. The physical properties of the spherical porous formed article are shown in Table 1.

Manufacturing Example 2

Fabrication of a Polysulfone Resin of the Terminal Hydroxyl Group/the Terminal Chlorine Group=50/50 (Mol %)

2,2-Bis(4-hydroxyphenyl)propane (bisphenol A)(45.66 g, 0.20 mol) was used in place of DHDPS in the above (Manufacturing Example 1). The other conditions were similar to the above (Manufacturing Example 1).

The obtained polymer powder was of a white powder shape, and the terminal group composition measured by 1H-NMR at 400 MHz was the terminal hydroxyl group/the terminal chlorine group=50/50 (mol %).

Comparative Example 1

600 g of a polyether sulfone resin having a terminal Cl group (Ultrason E6020P (trade name), BASF Japan Co., Ltd.) (the terminal hydroxyl group/the terminal chlorine group=0/100 (mol %)) was used as an organic polymeric resin. The terminal hydroxyl group composition of the organic polymeric resin was 0 mol %.

The other conditions were similar to in Example 1 to obtain a spherical porous formed article of 600 μm in average particle diameter.

The physical properties of the spherical porous formed article are shown in Table 1.

Comparative Example 2

600 g of a polysulfone resin (Udel P-3500LCD (trade name), Solvay Advanced Polymers L.L.C.) (the terminal hydroxyl group/the terminal chlorine group=0/100 (mol %)) was used as an organic polymeric resin. The terminal hydroxyl group composition of the organic polymeric resin was 0 mol %.

The other conditions were similar to in Example 1 to obtain a spherical porous formed article of 600 μm in average particle diameter.

The physical properties of the spherical porous formed article are shown in Table 1.

TABLE 1

| | Physical Properties | Example 1 | Example 2 | Example 3 | Example 4 | Example 5 | Example 6 | Comparative Example 1 | Comparative Example 2 |
|---|---|---|---|---|---|---|---|---|---|
| A | Organic Polymeric Resin (having a hydroxyl group) (A) | PES | PES | PES | PES | PES | PSF | — | — |
| | Terminal Hydroxyl group/Terminal Chlorine Group (mol %) | 90/10 | 90/10 | 90/10 | 90/10 | 50/50 | 50/50 | — | — |

TABLE 1-continued

| Physical Properties | | Example 1 | Example 2 | Example 3 | Example 4 | Example 5 | Example 6 | Comparative Example 1 | Comparative Example 2 |
|---|---|---|---|---|---|---|---|---|---|
| B | Organic Polymeric Resin (having no hydroxyl group) (B) | — | PES | PES | PSF | — | — | PES | PSF |
| | Terminal Hydroxyl group/Terminal Chlorine Group (mol %) | — | 0/100 | 0/100 | 0/100 | — | — | 0/100 | 0/100 |
| Formulation Mass Ratio (A:B) | | 100:0 | 90:10 | 10:90 | 90:10 | 100:0 | 100:0 | 0:100 | 0:100 |
| Terminal Hydroxyl group Composition of Organic Polymeric Resin (mol %) | | 90 | 81 | 9 | 81 | 50 | 50 | 0 | 0 |
| Average Particle Diameter of Porous Formed Article (μm) | | 600 | 600 | 600 | 600 | 600 | 600 | 600 | 600 |
| Porosity of Porous Formed Article (%) | | 87 | 86 | 87 | 86 | 86 | 86 | 87 | 87 |
| Amount of Inorganic Ion-Adsorbing Material Carried (%) | | 77 | 77 | 77 | 77 | 77 | 77 | 76 | 75 |
| Volume-based Specific Surface Area (m$^2$/cm$^3$) | | 79 | 79 | 79 | 79 | 79 | 79 | 79 | 79 |
| Phosphorus Adsorption Amount (g-P/L-R) | | 4.2 | 4.2 | 4.1 | 4.2 | 4.1 | 4.0 | 3.7 | 3.7 |
| Relative Cumulative X-Ray Intensity Ratio (−) | | 1.8 | 1.9 | 1.8 | 1.8 | 1.8 | 1.8 | 1.7 | 1.7 |
| Strength Retention (%) | | 99 | 99 | 95 | 97 | 97 | 97 | 93 | 90 |
| Turbidity of Coagulation Bath (Distinction of Marker Plate) | | none (distinguishable) | none (distinguishable) | none (distinguishable) | none (distinguishable) | none (distinguishable) | none (distinguishable) | white turbidity (distinguishable) | white turbidity (indistinguishable) |

In Table 1, "PES" denotes a polyether sulfone resin; and "PSF" denotes a polysulfone resin.

From the results of Examples 1 and 5 and 6, it was found that use of the polyether sulfone resin and the polysulfone resin having a terminal hydroxyl group could provide the porous formed Article exhibiting a high strength retention.

Further from the results of Examples 2 to 4, it was found that even if the polyether sulfone resin having a terminal hydroxyl group and the polyether sulfone resin or polysulfone resin having a usual Cl terminal group only were mixed and used, the porous formed article exhibiting a high strength retention could be obtained.

By contrast, from the results of Comparative Examples 1 and 2, it was found that in the case where the polyether sulfone resin and the polysulfone resin having no terminal hydroxyl group and having a usual Cl terminal group only were used, the strength retention decreased to less than 95%, and the durable performance in practical use could not be exhibited. Turbidity was confirmed in water in the coagulation bath, revealing that the carrying state of the inorganic ion-adsorbing material was bad, and the inorganic ion-adsorbing material was dissolved in water in the coagulation bath.

INDUSTRIAL APPLICABILITY

The porous formed article according to the present invention has the industrial applicability as adsorbents used for treatments of liquids and gases, filtration media, deodorants, antimicrobials, moisture adsorbents, freshness preservatives of foods, various types of carriers of chromatography, catalysts, recovering agents for valuable substances (for example, uranium and lithium) from wastewater, marine water and the like.

The invention claimed is:

1. A porous formed article, comprising:
an organic polymeric resin having at least one hydroxyl group and an inorganic ion-adsorbing material,
wherein the organic polymeric resin is a polyether sulfone resin and/or a polysulfone,
wherein the inorganic ion-adsorbing material comprises at least one metal oxide represented by the following formula (i):

$$MN_xO_n \cdot mH_2O \qquad (i)$$

wherein x is 0 to 3, n is 1 to 4, and m is 0 to 6; and M and N are each a metal element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta, and are different from each other, and
wherein the porous formed article is a spherical body having an average particle diameter of 100 to 2,500 μm, and has a relative cumulative X-ray intensity ratio of 1 to 10.

2. The porous formed article according to claim 1, wherein the organic polymeric resin has at least one hydroxyl group at a terminal thereof.

3. The porous formed article according to claim 2, wherein the organic polymeric resin has a terminal hydroxyl group composition of 5 to 90 mol %.

4. The porous formed article according to claim 2, wherein the organic polymeric resin has a terminal hydroxyl group composition of 5 to 81 mol %.

5. The porous formed article according to claim 1, wherein the organic polymeric resin has a terminal hydroxyl group composition of 5 to 100 mol %.

6. The porous formed article according to claim 1, wherein the organic polymeric resin is an organic polymeric resin represented by the following general formula (1):

[Formula 1]

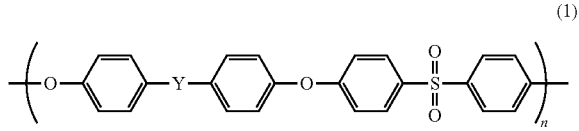

(1)

wherein n denotes an integer of 1 or more; Y denotes one selected from the group consisting of a direct bond, O, S, $SO_2$, CO, $C(CH_3)_2$, $CH(CH_3)$ and $CH_2$; and a hydrogen atom of the benzene ring may be replaced by an alkyl group having 1 to 6 carbon atoms or an aryl group having 6 to 8 carbon atoms.

7. The porous formed article according to claim 1, wherein the organic polymeric resin is a polyether sulfone resin represented by the following general formula (2):

[Formula 2]

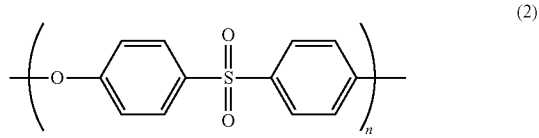

(2)

wherein n denotes an integer of 2 or more; and a hydrogen atom of the benzene ring may be replaced by an alkyl group having 1 to 6 carbon atoms or an aryl group having 6 to 8 carbon atoms.

8. The porous formed article according to claim 1, wherein the organic polymeric resin forms a porous structure having a communicating pore; and the organic polymeric resin carries an inorganic ion-adsorbing material on an outer surface of and in an interior thereof.

9. The porous formed article according to claim 1, wherein the porous formed article has a porosity of 50% to 95%.

10. The porous formed article according to claim 1, wherein an amount of the inorganic ion-adsorbing material carried is 65 to 95 wt. %.

11. The porous formed article according to claim 1, wherein the metal oxide is one or a mixture of two or more selected from the group consisting of the following (a) to (c):
   (a) titanium oxide hydrate, zirconium oxide hydrate, tin oxide hydrate, cerium oxide hydrate, lanthanum oxide hydrate and yttrium oxide hydrate;
   (b) an oxide of a composite metal of one metal element selected from the group consisting of titanium, zirconium, tin, cerium, lanthanum and yttrium with one metal element selected from the group consisting of aluminum, silicon and iron; and
   (c) an activated alumina.

12. The porous formed article according to claim 1, wherein the inorganic ion-adsorbing material comprises an activated alumina impregnated with aluminum sulfate.

13. The porous formed article according to claim 1, wherein the organic polymeric resin is a polyether sulfone resin and a polysulfone resin.

14. The porous formed article according to claim 13, wherein the polyether sulfone resin has a terminal hydroxy group and the polysulfone resin does not have a terminal hydroxy group.

15. An adsorbent comprising a porous formed article according to claim 1.

16. A method of manufacturing a porous formed article according to claim 1, the method comprising:
   a crushing and mixing step of crushing and mixing a good solvent of the organic polymeric resin, the inorganic ion-adsorbing material and a water-soluble polymer so as to obtain a slurry;
   a dissolving step of mixing and dissolving the organic polymeric resin in the slurry so as to obtain a slurry for forming; and
   a coagulating step of coagulating the slurry for forming in a poor solvent of the organic polymeric resin.

17. The method of manufacturing the porous formed article according to claim 16, wherein the crushing and mixing step is carried out using an agitated media mill.

18. The method of manufacturing the porous formed article according to claim 16, wherein the good solvent of the organic polymeric resin is one or more selected from the group consisting of N-methyl-2-pyrrolidone (NMP), N,N-dimethylacetamide (DMAC) and N,N-dimethylformamide (DMF).

19. The method of manufacturing the porous formed article according to claim 16, wherein the poor solvent comprises water.

20. The method of manufacturing the porous formed article according to claim 19, wherein in the coagulating step, a mixing ratio of the poor solvent to the good solvent is 100 to 40% by mass:0 to 60% by mass.

21. The method of manufacturing the porous formed article according to claim 16, wherein the coagulating step comprises a step of scattering the slurry for forming contained in a container from a nozzle provided on a side surface of a rotating container to thereby form a liquid droplet.

22. The method of manufacturing the porous formed article according to claim 16, wherein in the crushing and mixing step, the water-soluble polymer is added so that the water-soluble polymer/(the water-soluble polymer+the organic polymeric resin+the good solvent of the organic polymeric resin) is in a range of 0.1 to 40% by mass.

* * * * *